US006760905B1

(12) United States Patent
Hostetter et al.

(10) Patent No.: US 6,760,905 B1
(45) Date of Patent: Jul. 6, 2004

(54) LAZY COMPILATION OF TEMPLATE-GENERATED CLASSES IN DYNAMIC COMPILATION EXECUTION ENVIRONMENTS

(75) Inventors: Mathew J. Hostetter, Cambridge, MA (US); David Kranz, Arlington, MA (US)

(73) Assignee: Curl Corporation, Cambridge, MA (US)

(*) Notice: Subject to any disclaimer, the term of this patent is extended or adjusted under 35 U.S.C. 154(b) by 423 days.

(21) Appl. No.: 09/666,708

(22) Filed: Sep. 21, 2000

(51) Int. Cl.[7] .................................................. G06F 9/45
(52) U.S. Cl. ...................... 717/148; 717/136; 717/140; 717/153
(58) Field of Search ................................ 717/148, 136, 717/153, 140

(56) References Cited

U.S. PATENT DOCUMENTS

| | | | | |
|---|---|---|---|---|
| 5,361,351 A | * | 11/1994 | Lenkov et al. | 717/124 |
| 5,600,838 A | * | 2/1997 | Guillen et al. | 709/315 |
| 5,761,511 A | * | 6/1998 | Gibbons et al. | 717/122 |
| 5,864,700 A | * | 1/1999 | Barton et al. | 717/156 |
| 5,901,314 A | * | 5/1999 | Boehme et al. | 717/151 |
| 5,940,616 A | * | 8/1999 | Wang | 717/127 |
| 5,960,197 A | * | 9/1999 | Segnan | 717/140 |
| 6,032,152 A | * | 2/2000 | Pearson | 717/108 |
| 6,041,179 A | * | 3/2000 | Bacon et al. | 717/151 |
| 6,073,129 A | * | 6/2000 | Levine et al. | 707/4 |
| 6,078,744 A | * | 6/2000 | Wolczko et al. | 717/153 |
| 6,151,703 A | * | 11/2000 | Crelier | 717/136 |
| 6,185,609 B1 | * | 2/2001 | Rangarajan et al. | 709/219 |

OTHER PUBLICATIONS

Osborne, J., "Deep Inside C#: An Interview with Microsoft Chief Architect Anders Hejlsberg". [retrieved on Nov. 10, 2003] Retrieved from the Internet: <URL: http://windows.oreilly.com/lpt/a/2273, pp. 1–11.

Intersimone, David, "Borland AppAccelerator/Latte—Interview with Regis Crelier", *Summary of Java Just–In–Time Compilers*, Jul. 23, 1996, pp. 1–5, <URL:http://al.cs.ua.edu/{jones/jit.html>, retrieved on Jul. 14, 1903.

Morrison, Michael, "Java 1.1 Unleashed, Professional Reference Edition Chapter 53", Apr. 12, 1997, http://sunsite.i-isc.ernet.in/firlib/java/unleash/jul53.htm#E67E67>, retrieved on Jul. 14, 2003, pp. 1–6.

Krall, A., et al., "CACAO EIN 64BIT—JavaVM—Just–In–Time–Compiler", Jan. 1997, pp. 1–88.

Grant, B., et al., "The Benefits and Costs of DyC's Run–Time Optimizations", *ACM Transactions on Programming Languages and Systems*, vol. 22, No. 5, Sep. 2000, pp. 932–972.

Gilas Bracha, Martin Odersky, David Stoutamire and Philip Wadler, GJ Specification. Draft document, May 1998.

Gilas Bracha, Martin Odersky, David Stoutamire and Philip Wadler, "GJ: Extending the JAVA™ programming language with type parameters". Draft document, Aug. 1998.

(List continued on next page.)

*Primary Examiner*—Kakali Chaki
*Assistant Examiner*—Qamran Nahar
(74) *Attorney, Agent, or Firm*—Hamilton, Brook, Smith & Reynolds, P.C.

(57) ABSTRACT

Template-generated classes in program code are compiled efficiently through a process of lazy compilation resulting in improved compilation times. Lazy compilation includes the generation of objects representing a class template and a template-generated class as well as the selective compilation of class methods that are invoked in the program code. Code sharing is a further enhancement for increasing compilation speed by providing a system and method for sharing executable object code for compatible methods among different classes generated from the same class template.

84 Claims, 15 Drawing Sheets

OTHER PUBLICATIONS

Gilas Bracha, Martin Odersky, David Stoutamire and Philip Wadler, "Making the future safe for the past: Adding Genericity to the Java™ Programming Language". *OOPSLA '98*, Vancouver, BC, Canada, Oct. 1998.

Engler, Dawson R., "VCODE: A Retargetable, Extensible, Very Fast Dynamic Code Generation System", Laboratory for Computer Science, MIT, Cambridge, Massachusetts (1995).

Engler, Dawson R., "A VCODE Tutorial", Laboratory for Computer Science, MIT, Cambridge, Massachusetts (1996).

Wakeling, David, "The Dynamic Compilation of Lazy Functional Programs", *J. Functional Programming,* $1$(1): 1–21 (1993).

* cited by examiner

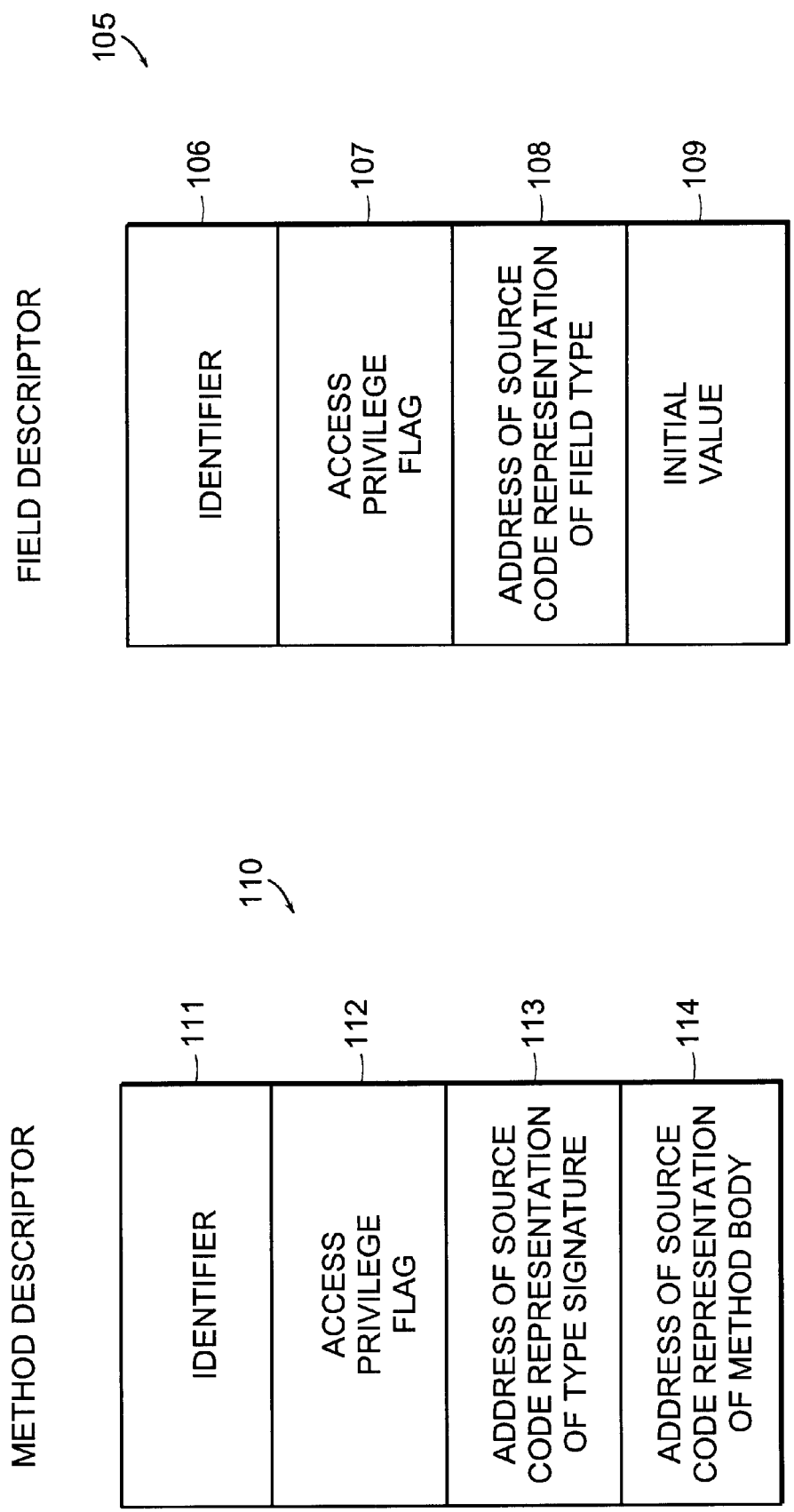

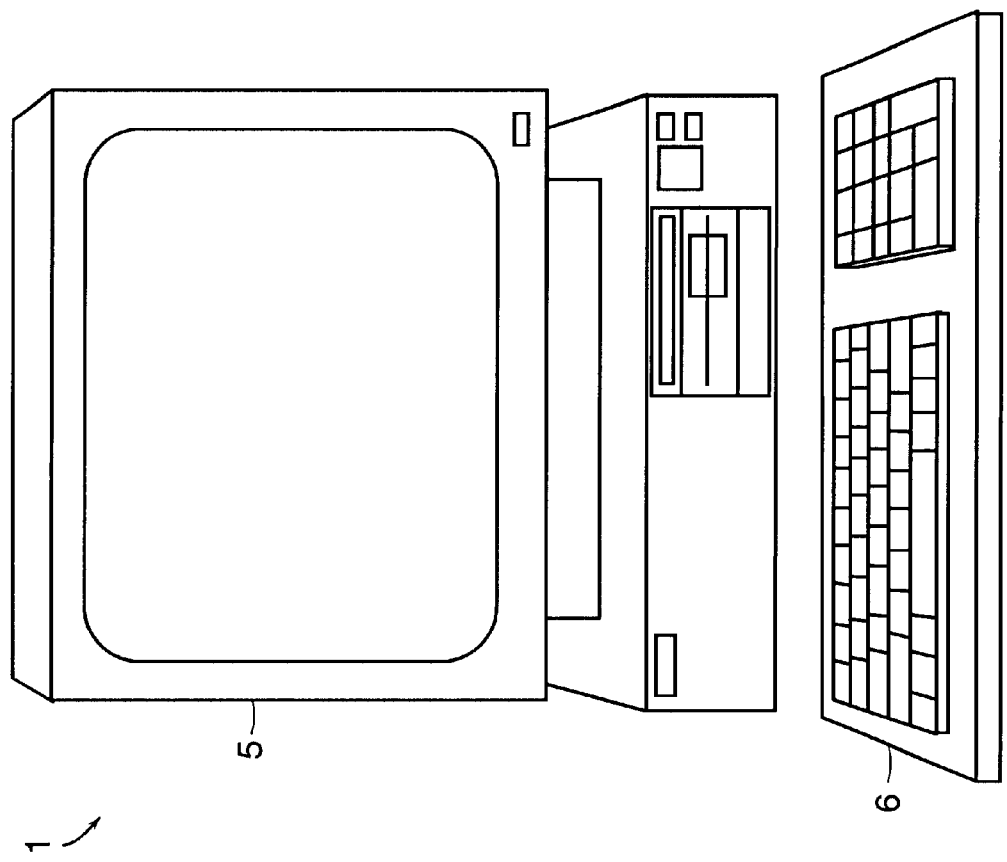

LAZY COMPILATION OF TEMPLATE-GENERATED CLASSES IN DYNAMIC COMPILATION EXECUTION ENVIRONMENTS

BACKGROUND OF THE INVENTION

Compilers typically convert source code into object code or some other intermediate code representation, such as byte codes. Source code is a set of instructions written in a programming language by a software developer. Object code, in general, is machine code or other low level code, translated from source code toward execution by a system's central processing unit (CPU). Compilation of source code can occur either statically or dynamically.

Statically compiled programs are compiled once and the resulting binary object code is used repeatedly. Typically, static compilation occurs prior to shipping the program to the end user. Therefore, the time required to compile a program in static compilation environments does not effect the performance of the program when executed by the end user.

Dynamic compilation execution environments, such as web browsers, involve the compilation of source code simultaneously or time-sharing with the execution of a program. Dynamic compilation is advantageous because code is shipped in a platform independent form and the compilation can use information about the target machine and security environment. However, the time required to dynamically compile the source code directly impacts the speed of the program execution.

Programming and scripting languages provide the software developer with a set of features and tools for organizing source code within a program. Class templates and classes generated from class templates (hereinafter template-generated classes) are examples of tools provided by some programming and scripting languages within static compilation environments.

In object-oriented programming, a class is a descriptive tool used in source code for characterizing an object as a set of data structures (i.e. fields) or a set of routines (i.e. methods). For example, an array of integers can be represented in a class, IntegerArray. Such a class may include a field for storing the size of the array and another field comprising a data structure for representing the integers stored in an IntegerArray. In addition, the IntegerArray class may include methods for accessing the contents of the array, such as "get" and "set" methods.

Once compiled, the class is represented as an object defining storage allocation for the class fields and specifying the types of data that can be stored within them. In addition, the class object provides access to executable object code for executing class methods. Instances of a class are generated from this class representation.

An instance is an object that exists during program execution that functions in accordance with the guidelines specified by the class representation. An instance stores its own values in the storage allocated for the class fields and executes methods compiled and stored by the class representation. An instance is created when a class is instantiated during program execution. Instantiation is the process of creating an instance of a class, typically, by calling a special operator or function (e.g., "new { }").

Class templates are useful programming tools for generating classes that provide the same basic functionality, but differ with respect to the types of data that are stored and serviced within the class. FIG. 1 is a block diagram illustrating an object hierarchy involving class templates. A class template 10 generates class 30 which is used to declare and instantiate class instances 50a and 50b. Likewise, class template 10 generates class 35 which is used to declare and instantiate class instances 55a and 55b.

A class template has source code forming the foundation for new template-generated classes. Different template-generated classes can be generated from the same class template definition by specifying different parameters. A parameter can be a primitive data type, class, value, or other data structure. Therefore, the use of class templates facilitates the reuse of source code.

The use of class templates also leads to more robust software, because such template-generated classes can be type-checked when compiled. In addition, the use of class templates in generating classes leads to faster software, because the compiler can generate efficient code with the knowledge of the parameters defining such classes.

SUMMARY OF THE INVENTION

Using static compilation techniques for dynamically compiling a software program would be slow and inefficient. For example, compiling an entire program may be wasteful of both time and memory when some portions of a program, such as an error handling routine, may not be used.

With respect to template-generated classes, the unnecessary object code results, is in part, from compiling source code that defines the body of class methods that are never invoked during program execution. In addition, unnecessary object code results from the generation of method bindings for class methods that are never referenced in the program code. A method binding is an object that stores information about an individual class method and is used to compile instructions in the program code that reference that method. Program code is the source code for the program in general.

The excess object code results in the program requiring more space on disk and, possibly, more memory (i.e. RAM) during program execution. When a program is statically compiled, the extra compilation time is tolerated because performance, in general, is not effected during program execution. However, in dynamic compilation execution environments, the program code is compiled at execution time so that extra compilation time makes the program run more slowly. Therefore, static compilation techniques implemented to compile template-generated classes would be prohibitive in both memory use and program performance.

The Java programming language is used, in part, to develop applets (i.e. programs that only execute within dynamic compilation execution environments, such as a web browser), but does not support class templates in its current language specification. Instead a Java programmer can use the class, Object, to store different data types, values, or structures. However, a disadvantage of using the Object class is that a Java compiler can not perform type-checking on Object-based classes until the program is running. This makes the software less robust, because any type errors are detected only at runtime by a runtime type dispatch.

There is a current proposal to add class templates to the Java programming language. However, the current proposal restricts the usage of parameters within the source code definition of a class template, limiting some of its benefits.

Therefore, it would be useful to be able to compile template-generated classes obtaining the full benefits of class templates without the issues of excess code generation and compilation time in dynamic compilation execution environments.

The following description discloses embodiments of the invention providing lazy compilation of template-generated classes in dynamic compilation execution environments. One embodiment involves creating a representation of the class template, creating a representation of a class generated from the class template, and generating method bindings, stored in the class representation, for only those methods referenced in the program code. This process of generating method bindings for referenced methods decreases the amount of code generated in compiling such classes and decreases the amount of time required to perform the compilation.

In addition, lazy compilation may include delaying compilation of the body of a referenced method until the class method is invoked by the execution of a method call instruction. Embodiments of the invention which provide for the compilation of a method body include execution of stub code initially referenced through an indexed method table for the invoked method. This action occurs in response to the class method being invoked to an instance of a template-generated class. The stub code initiates the compilation of the body of the invoked method resulting in executable object code. The address of the executable code replaces the address of the stub code in the method table for future invocation of the method by other instances of the same class.

Furthermore, embodiments of the invention which decrease the time required to compile the a method body include a process of code sharing. Code sharing includes sharing executable object code for compatible methods among different classes generated from the same class template. Executable object code is stored or referenced by a cache of the class template representation. A determination is made as to the compatibility of the method to be compiled and the cached object code. If compatible, the compilation of the method is avoided by simply replacing the address of the stub code with the address of the cached code.

In general, full compilation of methods for a particular class is performed for only those methods that are referenced in the program code, invoked during program execution, and are incompatible with previously compiled methods.

Thus, certain aspects of the invention involve compiling program code which includes a class template and a template-generated class in a dynamic compilation execution environment. Such compilation involves (1) creating a representation of the class template from its definition within the program code; (2) creating a representation of the template-generated class from its declaration within the program code, such that it points to the class template representation; and (3) generating method bindings stored in the class representation for methods referenced within the program code. The method bindings generated are substantially limited to those methods referenced in the program code. In addition, the compilation may involve (4) delaying compilation of method bodies for those methods referenced in the program code until they are invoked.

Each method within a class template is represented by a method descriptor storing or referencing the source code representations of a type signature and method body for that method. The source code representation of the type signature is used in the process of generating a method binding for the template-generated class representation.

The process for generating method bindings is triggered whenever a method call instruction, referencing a class method of a template-generated class, requires compilation. It involves (1) scanning the class representation for a previously generated method binding representing the referenced method; and if not found, (2) creating a method binding; (3) scanning the class template representation for the source code representation of the method's type signature; (4) compiling the source code representation of the type signature; (5) associating the resulting type signature object and method offset with the method binding; and (6) associating the method binding with the class representation. Once, the method binding is found or generated, the method call instruction is compiled using the type signature object and method offset.

The compiling of method bodies involves a class template representation which includes a method table mapping the methods of the template to stub code. The method table is referenced by the class template representation through a method table array. A copy of the method table is referenced by the class representation initially providing access to stub code for each method invoked on an instance of a template-generated class.

When a class method is invoked on an instance of a class representation during program execution. The method table of the class representation is referenced for the address of the stub code associated with the invoked method. The stub code is executed initiating the compilation of the source code representation of a method body such that a runtime compiler is invoked. The runtime compiler is invoked with the address of the source code representation of the method body stored within the class template representation. The address of the resulting executable code subsequently replaces the address of the stub code in the method table of the class representation.

Alternatively, the compilation of method bodies includes (1) referencing a cache of the class template representation for cached executable code for the invoked method; (2) determining whether the cached executable code is compatible with the invoked method; and if compatible, (3) replacing the address of the stub code in the method table with the address of the cached executable code.

A cache may be stored within a method descriptor of the class template representation, such that the cache includes the address of cached executable code or the address of a table mapping rules to cached executable code. The rules of the table provide criteria for determining whether the cached executable code is compatible with the invoked method.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3B illustrates a representation of a method descriptor of a class template representation according to one embodiment of the invention.

FIG. 3C illustrates a representation of a field descriptor of a class template representation according to one embodiment of the invention.

FIG. 12A illustrates a personal computer on which the invention may be implemented.

DETAILED DESCRIPTION OF THE INVENTION

A description of preferred embodiments of the invention follows.

Figure 1:
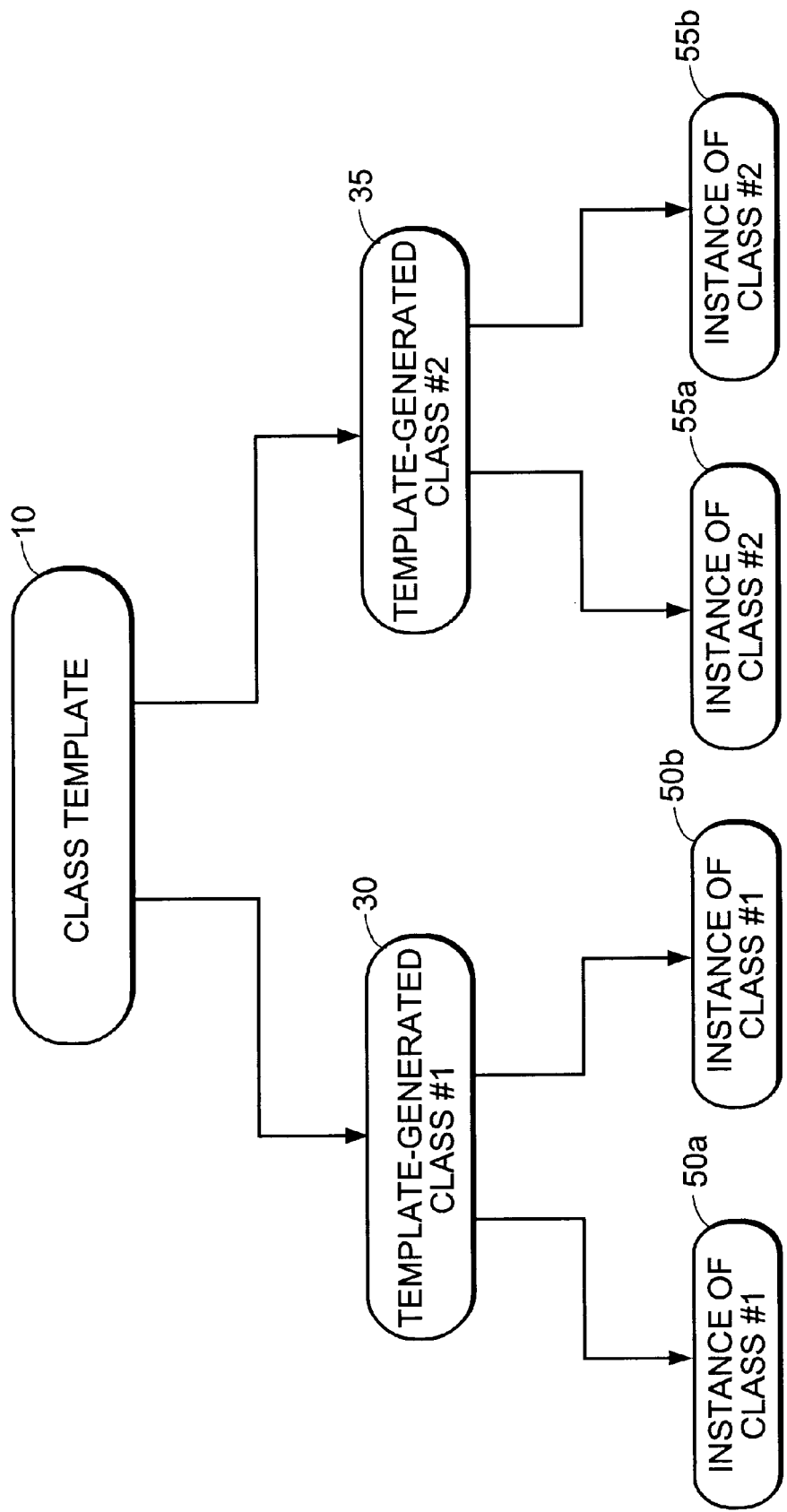
FIG. 1 is a block diagram illustrating an object hierarchy involving class templates.
Figure 2:
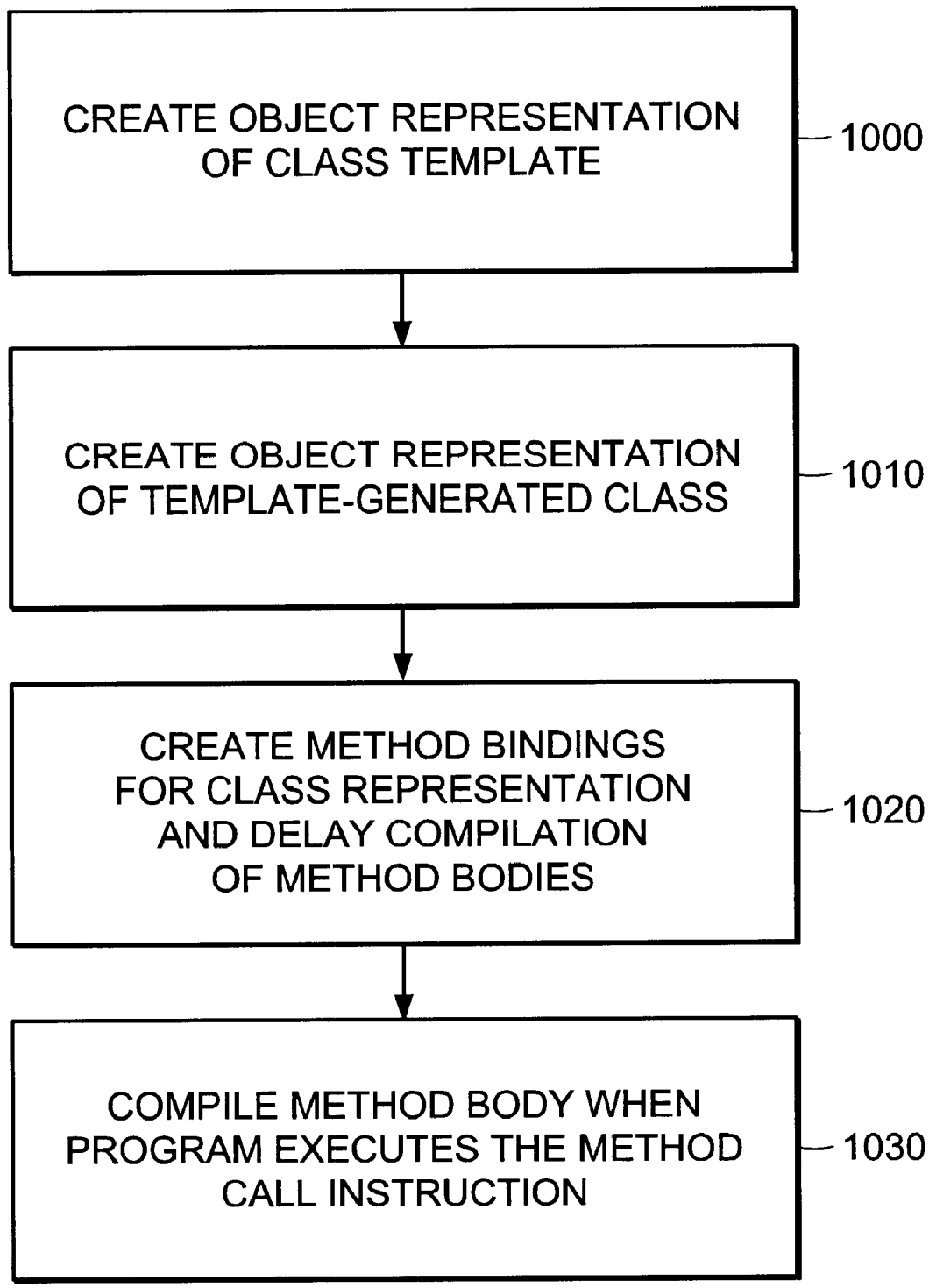
FIG. 2 is a flow diagram illustrating a high level overview of a process for lazy compilation of template-generated classes in dynamic compilation execution environments according to an embodiment of the invention.

FIG. 2 is a flow diagram illustrating a high level overview of a process for lazy compilation of template-generated classes in dynamic compilation execution environments according to an embodiment of the invention. The advantages include shorter compilation times and decreased code generation.

Figure 3A:
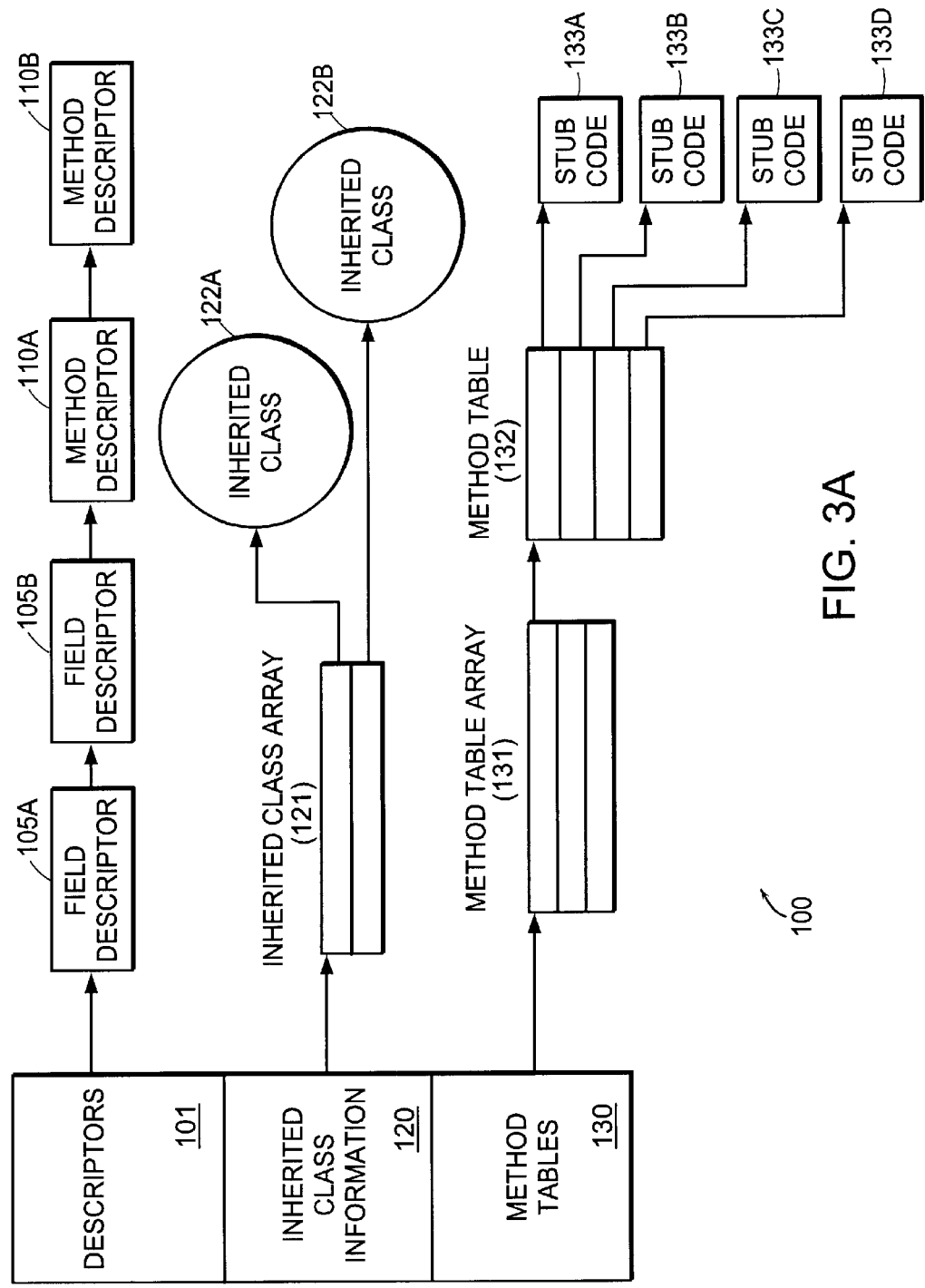
FIG. 3A is a block diagram illustrating a representation of a class template representation according to one embodiment of the invention.

In step 1000, source code defining the class template is compiled into an object representation suitable for use as a resource when subsequently compiling classes based on the template. An exemplary class template representation is shown in FIG. 3A. This class template representation provides a resource of source code for compiling different template-generated classes. In particular, the class template representation includes objects storing source code representations for each method defined within the template. These objects are referred to as method descriptors.

The source code representations stored in these method descriptors are not necessarily source code. These source code representations may be some type of intermediate code (i.e. code categorized between source code and object code) as well. In general, a source code representation is an abstract representation of the source code of the class template not yet specialized for any particular template-generated class. In one embodiment, the source code representations stored in these method descriptors represent a type signature and a method body. The type signature for a method represents the arguments that the method expects and the value that the method returns. The method body is the source code constituting the behavior or functionality for a method defined in the class template.

In addition, a method table is generated with entries for each defined method. Each entry stores an address of executable object code called stub code. Stub code is generated for each method and initiates the compilation of the corresponding method body when that method is invoked.

Referring back to FIG. 2, source code declaring a class based on the class template is compiled in step 1010 such that the class template representation is used to generate an object representation of the template-generated class. The resulting template-generated class representation includes a pointer to the class template representation and a copy of the method table containing the pointers to stub code.

Lazy compilation involves, in particular, two separate compilations of the source code representations stored in or referenced by the method descriptors (i.e. steps 1020 and 1030). The first compilation results in the type signature of a method being compiled into a method binding as in step 1020. The second compilation results in a method body being compiled into executable object code as in 1030. The address of the resulting executable code replaces the previous address of the stub code stored as an entry in the method table.

In step 1020, a source code instruction (i.e. method call instruction) that refers to a method of a template-generated class causes the generation of a method binding. A method binding is an object that stores information about a class method. Method bindings are generated for only those class methods that are referenced in the program code. Once generated, a method binding is used to compile the method call instruction.

Most programs having template-generated classes do not reference every method of the class. Therefore, limiting the creation of method bindings for class methods that are referenced in the program code avoids unnecessary object code generation and decreases total compilation time.

In step 1030, the source code representation that constitutes the body of a method is compiled when the program executes a compiled method call instruction invoking that method. The execution of the compiled method call instruction causes executable code referenced by an entry within the method table associated with the invoked method to be executed. When the class method is invoked for the first time, stub code for that method initiates the compilation of the method body stored in or referenced by a corresponding method descriptor. Once compiled, the program toggles back to execution mode and the resulting executable object code is executed.

Method bodies are compiled once they are invoked during program execution, because some methods are never invoked even though they are referenced in the program code. Therefore, delaying compilation of method bodies in this manner avoids further generation of unnecessary object code.

Programs are generally broken up into source code components, such as source files. In dynamic compilation execution environments, the state of the environment toggles between compilation mode and execution mode, such that source files constituting the program are compiled at different times. Therefore, although the following descriptions illustrate lazy compilation and code sharing as occurring in one continuous sequence, lazy compilation and code sharing can occur over a series of compilation and execution phases.

When a source code definition for a class template is encountered in the program code, the class template is compiled to create a class template representation. A ClassTemplate is an object representation of the class template in memory.

FIG. 3A is a block diagram illustrating a representation of an exemplary class template representation (i.e. "ClassTemplate") 100 according to one embodiment of the invention. In brief overview, a ClassTemplate 100 includes a data structure 101 containing references to field and method descriptors, a data structure 120 containing references to any inherited classes 122A and 122B via an array data structure 121, and a data structure 130 containing a method table array 131 referencing a method table 132.

Describing Class Template 100 in more detail, a descriptor is generated for each field and method defined within the class template. Field and method descriptors are data objects storing or referencing the source code representations of the fields and methods defined by the class template. These descriptors provide a resource of source code when compiling the fields and methods for different classes. In one embodiment, field descriptors (105A and 105B, generally referred to as 105) and method descriptors (110A and 110B, generally referred to as 110) are stored in the ClassTemplate 100 as elements of a linked list.

FIG. 3B illustrates a representation of a method descriptor 110 of a ClassTemplate 100 according to one embodiment of the invention. A method descriptor 110 includes an identifier 111 (i.e. name), an access privilege flag 112 (e.g., flag indicating either public, private, or protected access from other code) an address of a source code representation for the type signature 113 and an address of a source code representation for the body of the method 114. The method body is the source code representation constituting the behavior or functionality for a method defined in the class template. The type signature for a method represents the arguments that the method expects and the values that the method returns. Methods can return more than one value.

FIG. 3C illustrates a representation of a field descriptor 105 of a ClassTemplate 100 according to one embodiment of the invention. A field descriptor 105 includes an identifier (i.e. name) 106, an access privilege flag 107 (e.g., flag indicating either public, private, or protected access from other code), an address of a source code representation of its declared type 108, such as an integer or character, and an initial value 109. The information stored within or referenced by a field descriptor 105 is used when a field needs to be compiled for a template-generated class.

Referring back to FIG. 3A, the ClassTemplate 100 references a method table 132 through a method table array 131. The method table 132 is generated from the method descriptors 110 such that there is one entry for each class method defined by the class template. Therefore, in one embodiment the offset of a particular method within the method table 132 is relative to the position of its method descriptor within the list of method descriptors 110. The method table 132 initially maps the methods of the ClassTemplate 100 to stub code (133A, 133B, 133C, and 133D, generally referred to as 133). Each unit of stub code 133 is generated specifically to reference a specific method descriptor 110.

Stub code 133 is executable code that invokes a compiler with the address of a method descriptor 110. When invoked, the source code representation of the method body 114 stored within or referenced by the method descriptor 110 is compiled, resulting in executable object code for that method. The process of compiling a method body is described later with reference to FIG. 7.

In one embodiment, the method table 132 is referenced from an entry of the method table array 131. Where the class template inherits from another class or class template, the method table array 131 also contains entries with pointers to the method tables of the inherited classes or class templates (not shown in FIG. 3).

With respect to inherited class information 120, the ClassTemplate 100 stores references to object representations in memory of inherited classes and class templates (122A and 122B, generally referred to as 122) as an array of pointers 121.

The ClassTemplate 100 serves as the basis for generating object representations of template-generated classes in memory. The ClassTemplate 100 provides source code representations for all the methods and fields defined in the class template (110 and 105 respectively), method tables 130, and inherited class information 120 for generating these class object representations. One ClassTemplate 100 is generated for each class template defined in the program code regardless of the number of classes that are generated from it.

In general, template-generated classes used in program code are data types. Such classes are declared in the program code by a variable declaration statement in which the parameters of the class template are replaced with actual data types or values. Specifying different parameters for the class template allows the software programmer to reuse the source code for the methods and fields defined within the class template.

When the compiler encounters in the program code a variable declaration in which the declared type is a template-generated class, the class is compiled into a template-generated class representation, an object representation of the template-generated class in memory.

If a template-generated class representation has already been generated for that class, no additional class representation is created. A single template-generated class representation is used to process references and method calls for all declared instances of that class.

Figure 4A:
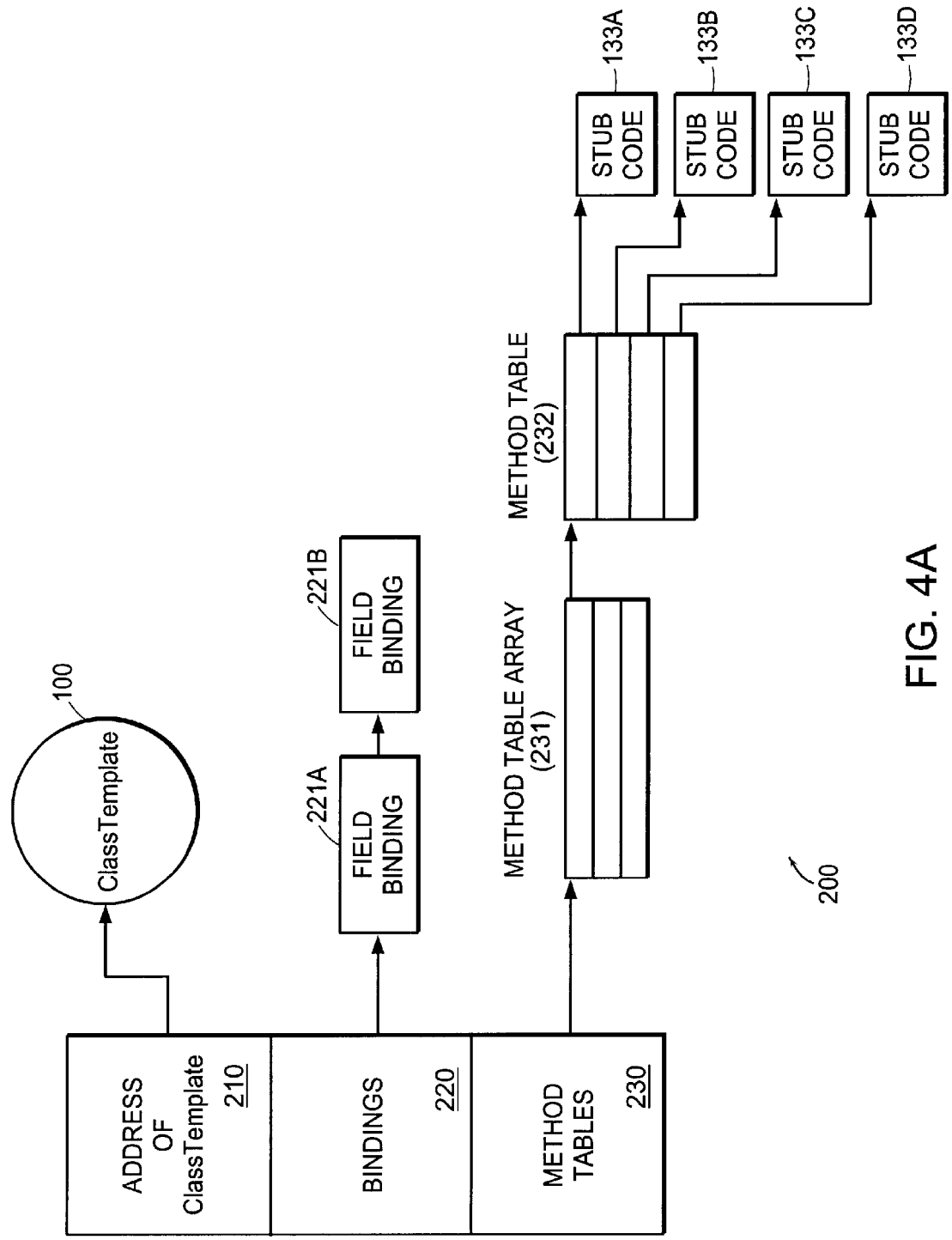
FIG. 4A is a block diagram illustrating a representation of a template-generated class representation according to one embodiment of the invention.

FIG. 4A is a block diagram illustrating an exemplary template-generated class representation (i.e. ClassObject) 200 according to one embodiment of the invention. In brief overview, the ClassObject 200 includes a data structure 210 containing the address of the ClassTemplate 100, a data structure 220 initially containing references to field bindings 221A and 221B (generally referred to as 221), and a data structure 230 containing a method table array 231 referencing a method table 232 copied from the ClassTemplate 100.

In brief overview, a binding is an object that stores information about a class method (i.e. method binding) or a field pertaining to the class (i.e. field binding 221). A method binding is used to compile source code instructions that reference a corresponding class method (i.e. method call instruction), while a field binding is used to define a corresponding field of an instance 300 of the ClassObject 200.

In one embodiment, bindings are stored in the ClassObject 200 as elements of a linked list. When the ClassObject 200 is created, field bindings 221 are created and added to a bindings list for each field defined by a field descriptor 105 in the ClassTemplate 100.

Initially, no method bindings are created and added to the bindings list 220. Most programs having template-generated classes do not reference every method defined for such a class. Therefore, limiting the creation of method bindings for class methods that are referenced in the program code avoids unnecessary object code generation and decreases total compilation time.

Figure 4C:
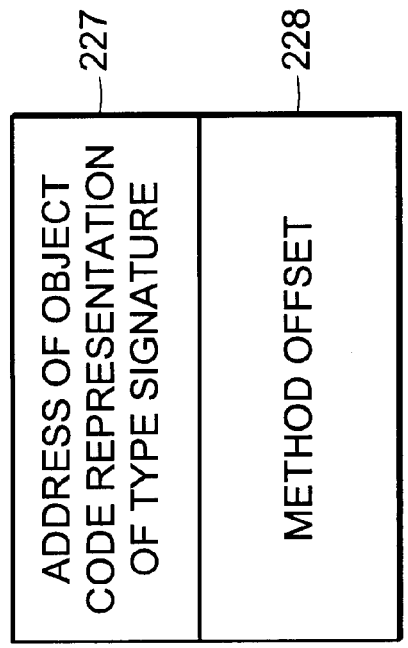
FIG. 4C illustrates a representation of a method binding of a template-generated class representation according to one embodiment of the invention.
Figure 4B:
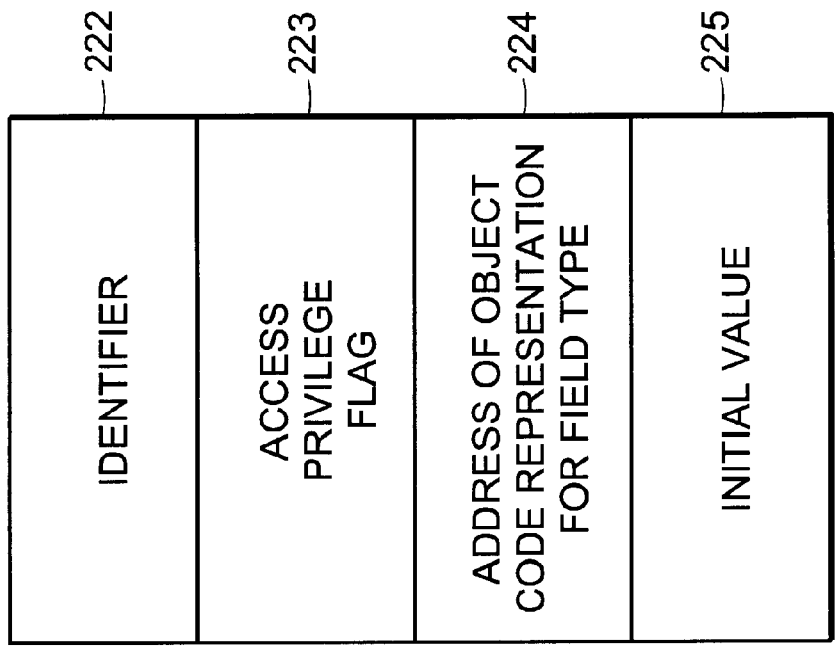
FIG. 4B illustrates a representation of a field binding of a template-generated class representation according to one embodiment of the invention.

FIG. 4B illustrates a representation of a field binding 221 of a ClassObject 200 according to one embodiment of the invention. In a ClassObject 200, a field binding 221 includes an identifier (i.e. name) 222, an access privilege flag 223, the address of a type object representing the type declared for the field 224, and an initial value for the field 225.

The information stored in or referenced by a field binding is used to define the characteristics for a corresponding field of an instance 300 of the ClassObject 200. For instance, the type object defines the field in terms of what values it can store and operations it can perform. The address of the type object 224 is obtained from the resulting object code generated from the compilation of the source code representation of the field type 108 stored in or referenced by the associated field descriptor 105 of the ClassTemplate 100. Alternatively, the address of the type object 224 is the address of the object code for the same field type previously compiled.

Referring back to FIG. 4A, the method table 232 is copied from the ClassTemplate 100 for the ClassObject 200. The ClassObject 200 references the method table 232 through its method table array 231. The method table 232 contains all the addresses to stub code 133 generated during the creation of the ClassTemplate 100.

However, the stub pointers stored within the method table 232 are temporary. After stub code for a corresponding class method is executed, the entry storing the stub pointer is replaced with the address of executable object code corresponding to the class method. All instances of the same class are represented by the same ClassObject 200. Therefore, all instances of the ClassObject 200 refer to the same method table 232. When a stub pointer is substituted with the address of executable object code corresponding to a class method, all instances that subsequently attempt to execute that method invoke the executable code directly, avoiding recompilation.

In addition, where the class template inherits from another class or class template, copies of the method tables of the inherited class or class template are referenced by the ClassObject 200 through its method table array 231 (not shown in FIG. 4A).

The address 210 of the ClassTemplate 100 is used to reference the field and method descriptors 101 during the process of generating a ClassObject 200.

The next step in the process is to create method bindings for the ClassObject. FIG. 4C illustrates a representation of a method binding 226 associated with a ClassObject 200 according to one embodiment of the invention. A method binding 226 includes the address for the object code representation of the type signature 227 and a method offset 228 into the method table 232.

In brief overview, a method binding 226 is created for each class method that is referenced by a source code instruction (i.e. method call instruction) within the program code. Furthermore, the method call instruction is compiled using the method binding, but compilation of the body of the method is delayed until the method is actually invoked during execution of the program.

Figure 5:
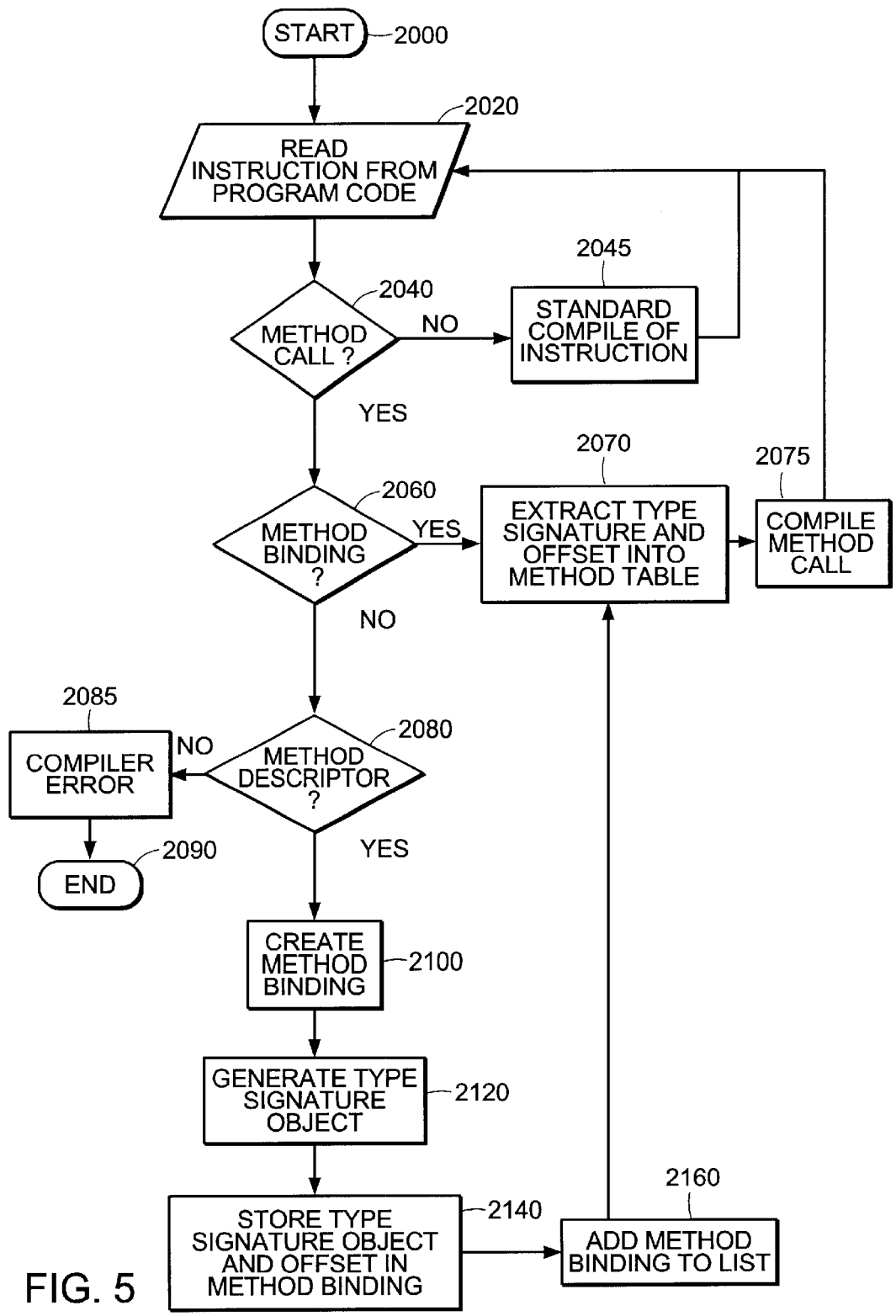
FIG. 5 is a flow diagram illustrating a first phase of the process for lazy compilation of class methods according to one embodiment of the invention.

FIG. 5 is a flow diagram illustrating a first phase of the process for lazy compilation of class methods according to one embodiment of the invention starting at step 2000.

In step 2020 the compiler reads in an instruction from the program code.

In step 2040, if the instruction is a method call to an instance (i.e. the method call instruction), the compiler proceeds to step 2060. If not, a standard compile of the instruction occurs in step 2045. Subsequently, the compiler returns to step 2020 to read in the next instruction.

In step 2060 the bindings 220 of the ClassObject 200 associated with the template-generated class are scanned for a method binding 226 corresponding to the class method specified in the method call instruction. If the method binding 226 does not exist, the compiler proceeds to step 2080.

Otherwise, if the method binding was generated previously, the compiler extracts the method's type signature 227 and method offset 228 into the method table 232 from the method binding 226 in step 2070. With the type signature 227 and offset 228, the method call instruction is compiled in step 2075. Subsequently, the compiler returns to step 2020 to read in the next instruction.

In step 2080 the ClassObject 200 references the ClassTemplate 100 through its stored address 210 and scans the list of method descriptors 110 for a method descriptor containing the source code representation of the class method referenced in the method call instruction. If the none of the method descriptors 110 of the ClassTemplate 100 correspond to the referenced class method, the compiler notifies the software programmer or end user of the compilation error through a user interface in step 2085. Otherwise, the compiler proceeds to step 2100 in which the compiler creates a method binding 226 for the ClassObject 200.

In step 2120, the compiler compiles the source code representation of the type signature 113 (FIG. 3B) from the method descriptor 110 of the ClassTemplate 100 resulting in a type signature object. However, the compilation of the source code representation of the method body 114 is delayed until the program attempts to execute the method call instruction actually invoking the class method.

In step 2140, the compiler stores or references the resulting type signature object and method offset (i.e. index into the method table 132) in the method binding 226 for the class method. In one embodiment, the method offset is determined by the relative position of the method descriptor for the referenced class method within the list of method descriptors 110.

In step 2160, the compiler adds the method binding 226 to the bindings data structure 220 of the ClassObject 200.

Returning to step 2070, the compiler extracts the method's type signature object 227 and offset 228 from the newly created method binding 226. With the type signature 227 and method offset 228, the method call instruction is compiled as an indirect function call through the method table in step 2075. Subsequently, the compiler returns to step 2020 to read in the next instruction.

This process for creating and adding method bindings to the ClassObject and delaying compilation of the methods until the program invokes them at runtime decreases the code generation and time to compile due to the inherent overhead involved.

Figure 6:
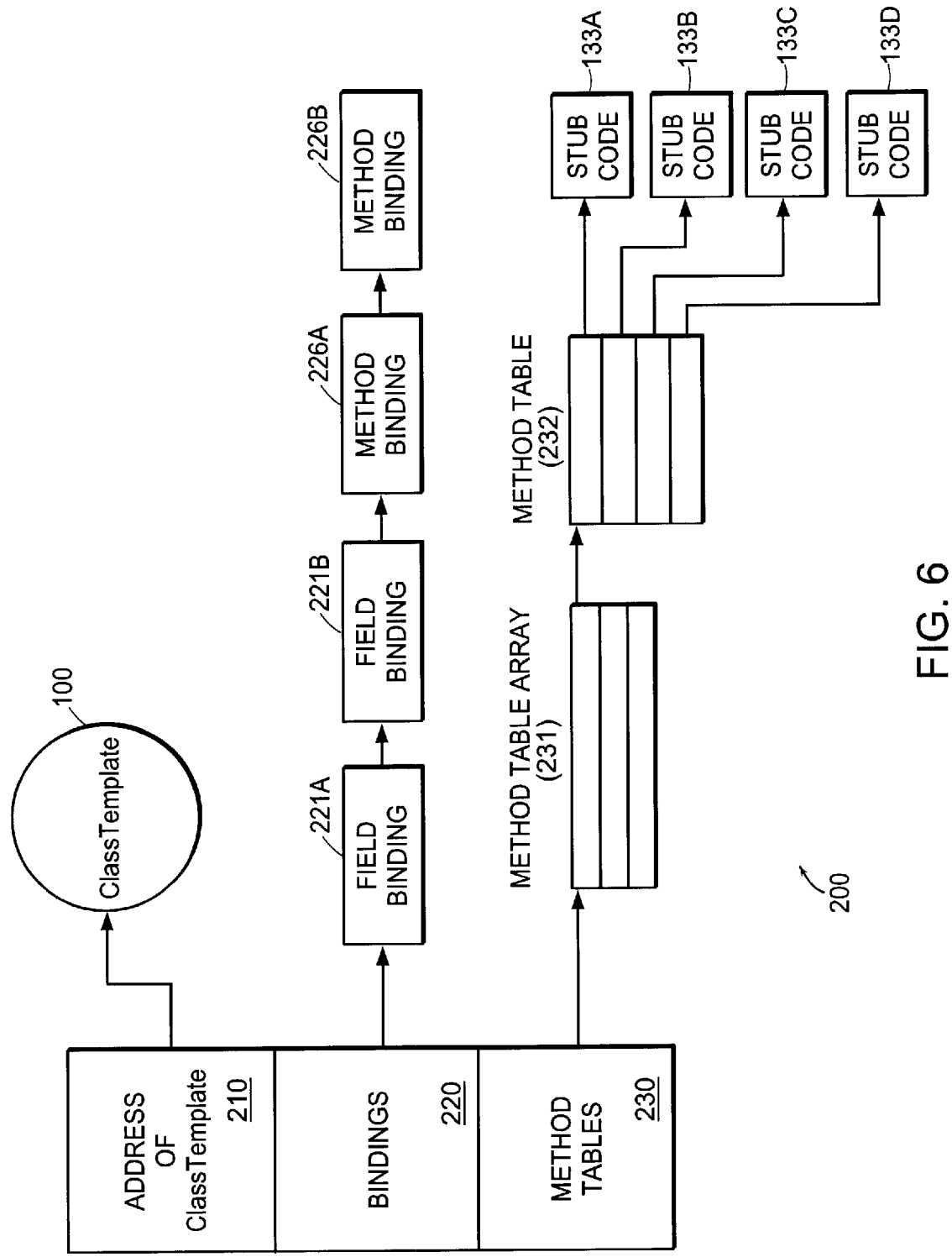
FIG. 6 is a block diagram illustrating a representation of a template-generated class representation after the first phase of lazy compilation of the class methods according to one embodiment of the invention.

FIG. 6 is a block diagram illustrating a representation of a template-generated class representation (i.e. ClassObject 200) after the first phase of lazy compilation of the class methods according to one embodiment of the invention. The difference in the ClassObject 200 before and after lazy compilation of the class methods is that the ClassObject 200 includes method bindings (226A and 266B, generally referred to as 226) along with its list of field bindings 221. Method bindings 226 are generated only for those methods that are referenced within the program code.

In the initial phase of lazy compilation previously described, the program code is converted from the original program code to executable object code. In the second phase, the source code representation which constitutes the body of a class method is compiled into executable object code upon the class method being invoked at runtime.

Figure 7:
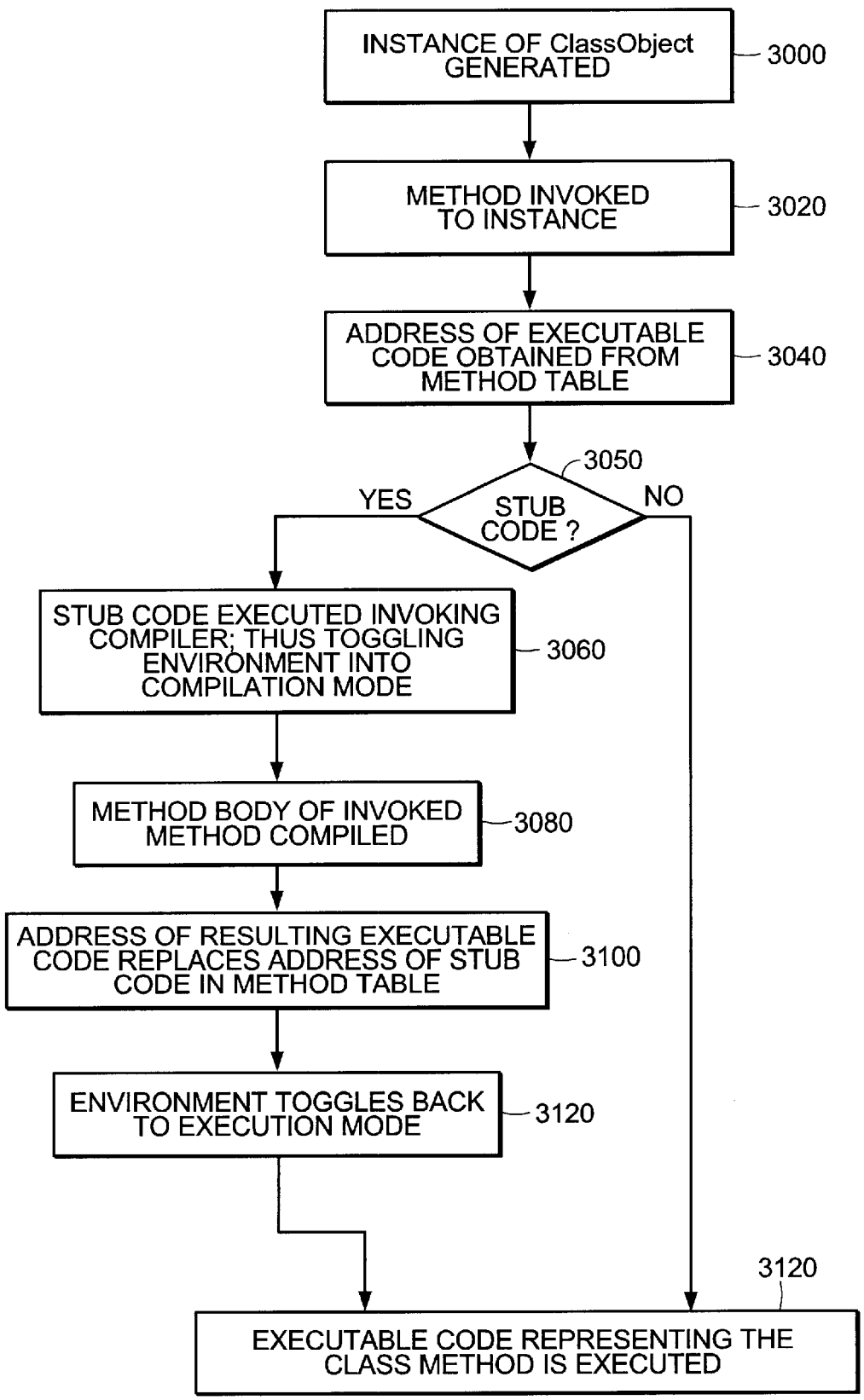
FIG. 7 is a flow diagram illustrating a second phase of the process for lazy compilation of class methods according to one embodiment of the invention.

FIG. 7 is a flow diagram illustrating a second phase of the process for lazy compilation of class methods according to one embodiment of the invention. This phase includes compiling the source code representation constituting the method body of a class method when the method is invoked by the program at runtime.

Figure 8:
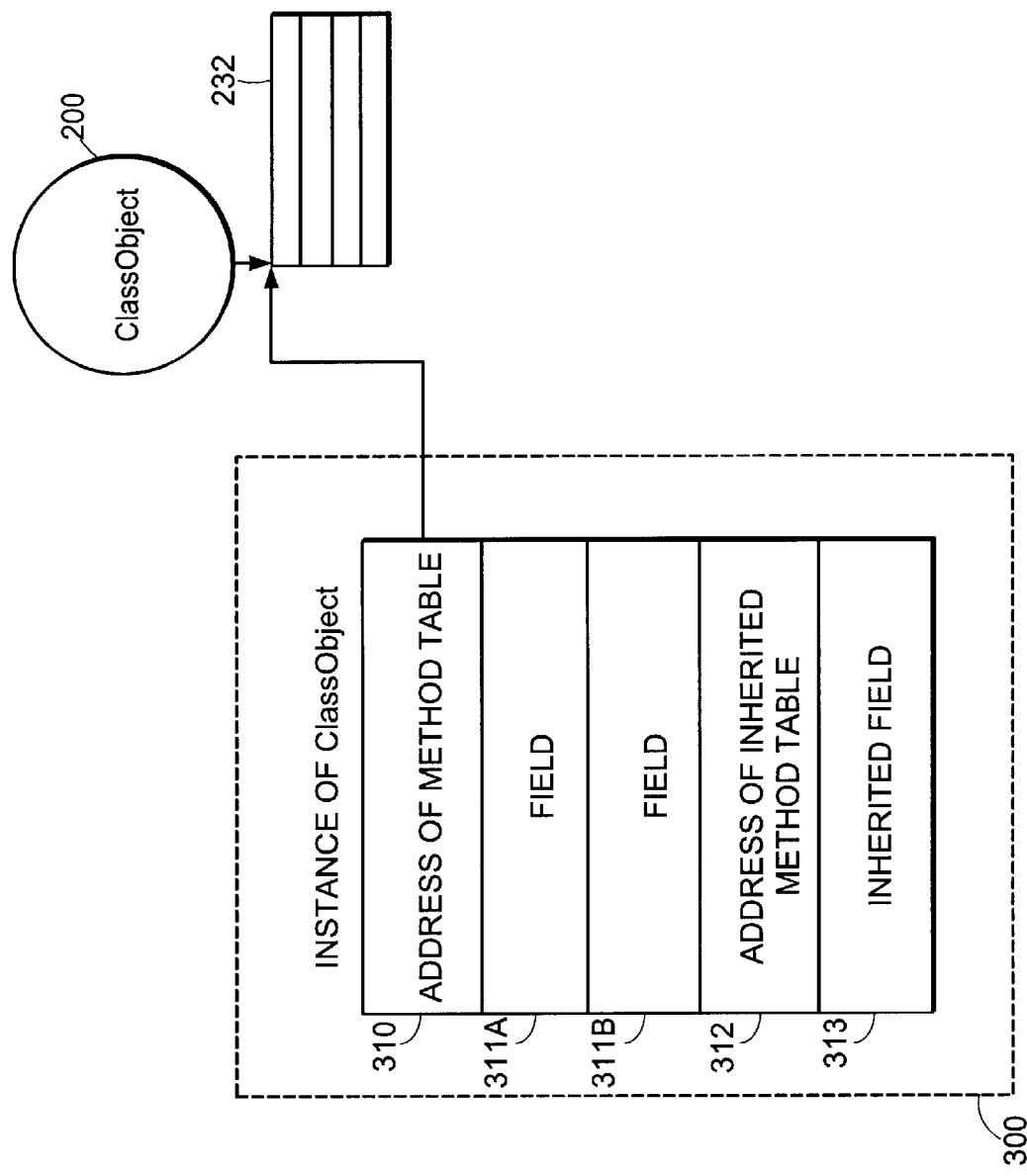
FIG. 8 is a block diagram illustrating a representation of an instance of a template-generated class representation during program execution according to one embodiment of the invention.

In step 3000, the program executes a set of compiled instructions which create an instance 300 of the ClassObject 200 as shown in FIG. 8. FIG. 8 is a block diagram illustrating a representation of an instance 300 of a ClassObject 200 during program execution according to one embodiment of the invention. An instance is an object that is generated during program execution that functions in accordance with the guidelines specified by ClassObject 200. Every instance 300 of a ClassObject 200 includes an address 310 to the method table 232 of the ClassObject 200 and memory 311A and 311B allocated for storing field values. Where other classes or class templates are inherited, the instance additionally contains addresses 312 to the respective inherited method tables as well as memory 313 allocated for inherited fields.

In step 3020, the program executes object code, corresponding to the method call instruction in the program code, which invokes a class method to an instance 300 of the ClassObject 200.

In step 3040, the method table 232 of the ClassObject 200 is referenced at the offset of the invoked method to obtain the address of the executable code mapped to this method. The executable code may be the original stub code 133 or object code resulting from a previous compilation of the method body.

Although there is no specific check, step 3050 illustrates the direction of the process depending on whether the executable code is stub code 133 or object code compiled for the class method. In step 3050, if the address does not point to stub code, then the method table is addressing executable object code that was previously compiled for this method. The program continues in execution mode executing the executable code mapped to the invoked method in step 3140. Otherwise, the address is pointing to stub code and the process proceeds to step 3060.

In step 3060, the stub code 133, which is mapped to the invoked method, is executed at the address specified in the method table entry. The execution of the stub code 133 invokes the compiler with the address of the method descriptor 110 of the ClassTemplate 100 for the invoked method. This step toggles the environment into compilation mode.

In step 3080, the source code representation 114 stored in or referenced by the method descriptor 110 for the body of the invoked method is compiled resulting in executable object code that implements the intended functionality or behavior when executed.

In step 3100, the address of the resulting executable object code replaces the address of the stub code 133 in the method table 232 for future invocations of the method. In addition, since all instances 300 of the same ClassObject 200 share the same method table 232, future execution of the method by any instance 300 occurs without the need for recompilation of the method body.

In step 3120, the environment toggles back to execution mode.

In step 3140, the resulting executable object code of the invoked method is executed producing the desired result.

Figure 9:
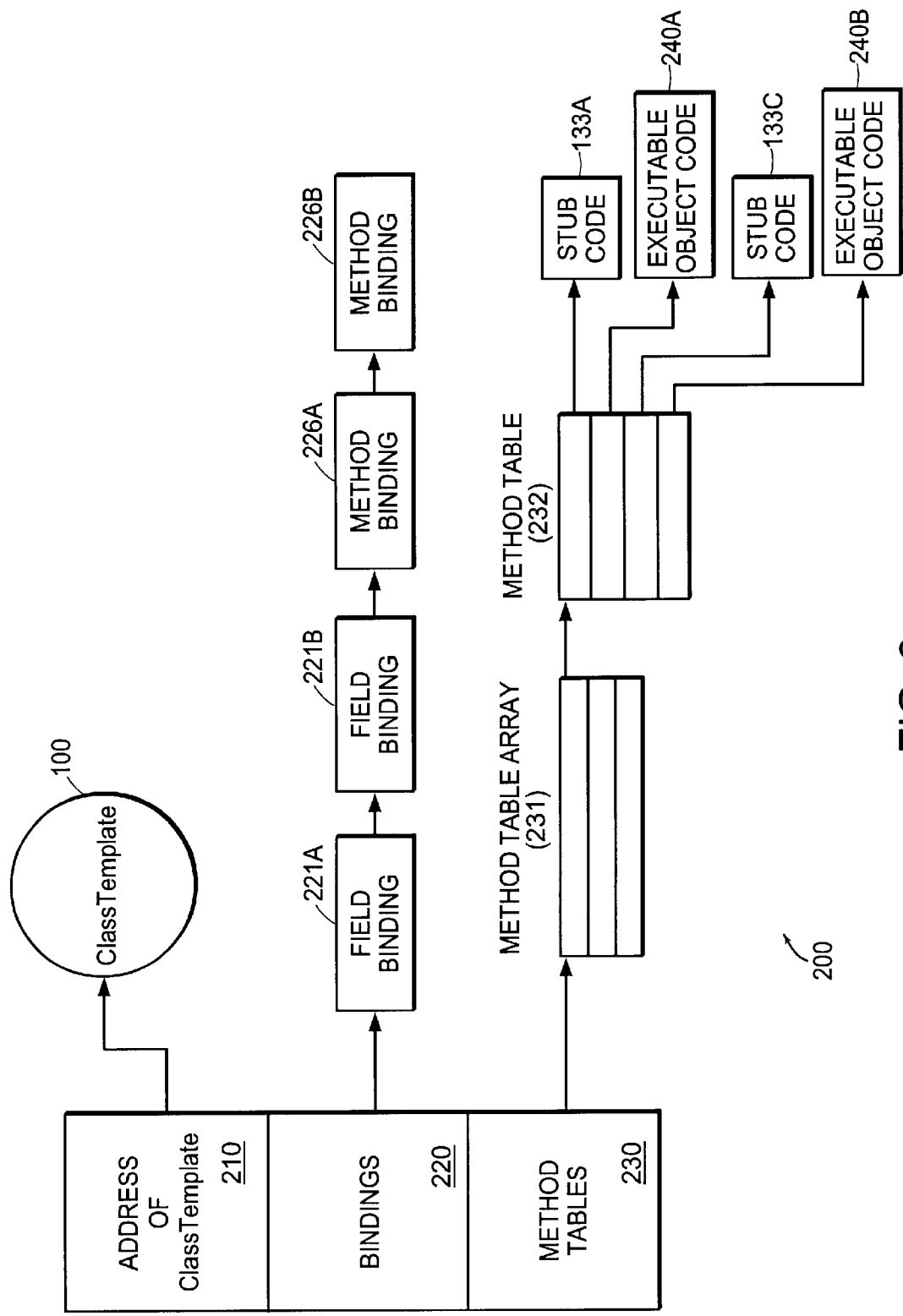
FIG. 9 is a block diagram illustrating a representation of the template-generated class representation after the source code representation constituting the method body of a class method is compiled according to one embodiment of the invention.

FIG. 9 is a block diagram illustrating a representation of the ClassObject 200 after the source code representation constituting the method body of a class method is compiled according to one embodiment of the invention. In particular, the method table entries corresponding to the compiled class methods are replaced with addresses to executable object code (240A and 240B, generally referred to as 240). By replacing the stub pointers of the method table entries, instances of this ClassObject can invoke a method and directly execute the object code without having to recompile the method body for that method.

In an alternative embodiment of the invention, a system and method for code sharing is implemented. Code sharing works in conjunction with lazy compilation to further decrease compilation time and code generation.

Code sharing provides the ability to cache and share executable object code of compatible methods among the ClassObjects representing different classes. Therefore, instead of recompiling the same source code for each ClassObject, the address of the stub code in the ClassObject's method table is replaced with the address of the cached object code. This process decreases the compilation time since the compilation step is avoided. In addition, code generation is decreased because the method tables of the each individual ClassObject reference the same cached object code.

Figure 10:
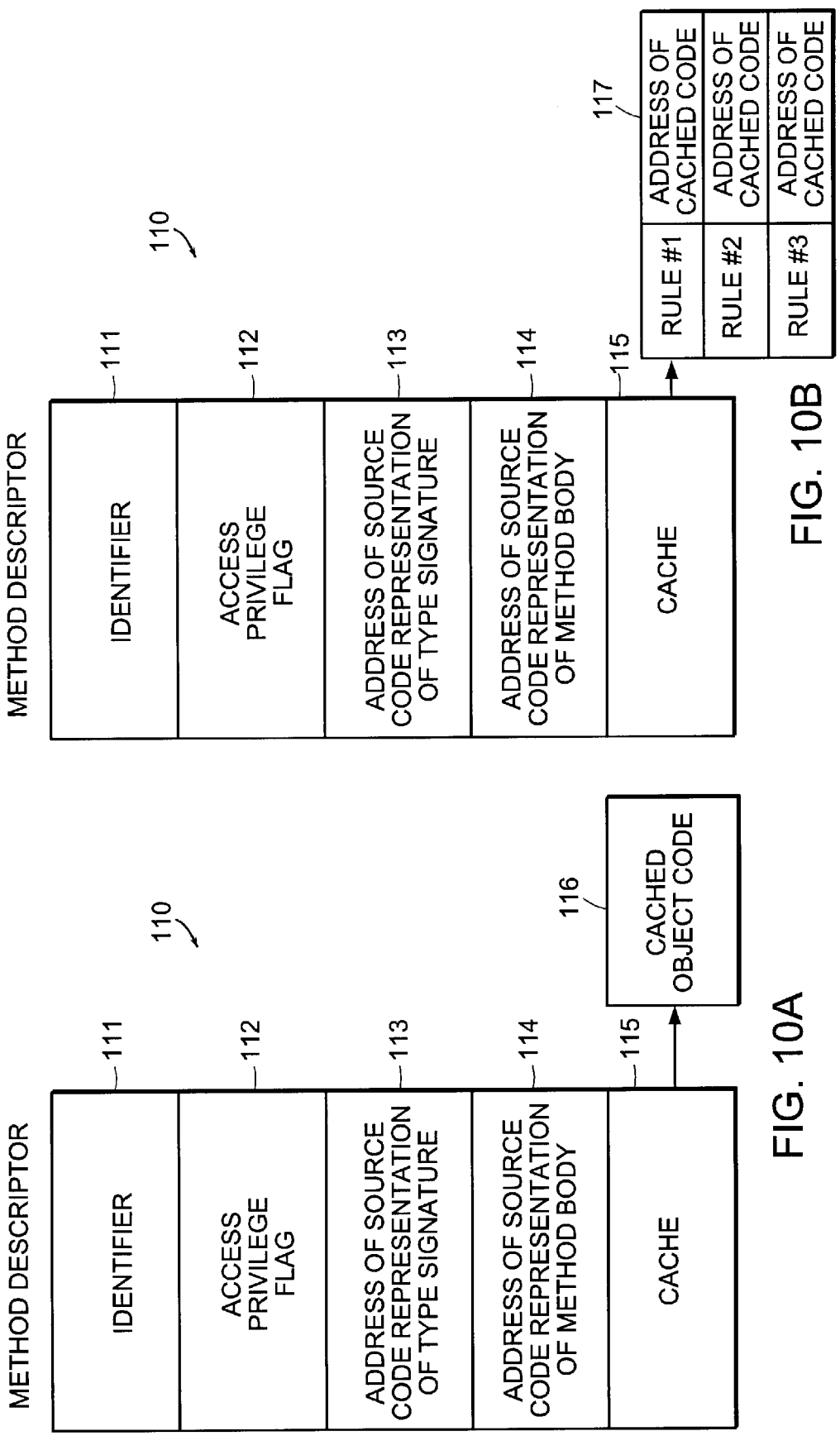
FIG. 10A is a block diagram illustrating a representation of a method descriptor of a class template representation for code sharing according to one embodiment of the invention.
FIG. 10B is a block diagram illustrating another representation of a method descriptor of a class template representation for code sharing according to one embodiment of the invention.

In order to implement code sharing, the method descriptors of the ClassTemplate further include a cache 115 for storing the address of the cached executable object code 116 as shown in FIG. 10A. Alternatively, as shown in FIG. 10B, the cache 115 stores the address of a compiler-generated table 117 mapping a set of rules with an address of the associated cached code for each rule. Each rule is a test for determining whether the method for a particular ClassObject is compatible with the cached object code for another ClassObject.

Since a ClassObject 200 is defined by its parameters, the rules, in general, are based on attributes of the parameters. An example of such an attribute is the memory representation of the parameter. For example, if the method is concerned only about the bit size of the parameter type, the rule may allow the class method to be compiled having a parameter that is 32 bits in length to share the cached object code previously compiled for a class method taking a parameter was 32 bits in length for the same ClassObject.

In addition, a method is compatible among all ClassObjects where the method does not refer to the parameter of the ClassObject at all. For example, a method that prints error strings or debug messages and does not reference a parameter is compatible for all ClassObjects generated from the same ClassTemplate. Such a method is compatible because the executable object code, compiled from its method body, is the same regardless of the ClassObject for which it is compiled.

More generally, the compiler can see which properties of the ClassObject parameters, if any, are relevant to the compilation of each method. Two methods can be shared between different ClassObjects if the type parameters have the same relevant properties. The compiler can automatically determine which properties are relevant by recording the type properties it queries during compilation of the method.

Furthermore, it may be possible to have a rule that will allow parameter types that can be converted from one to another to use the same cached code, such as in the case where the cached code is compiled for a class method taking a parameter of type "long" and the class method to be compiled taking a parameter of type "integer." In this case, the integer could be cast into a type "long."

Figure 11:
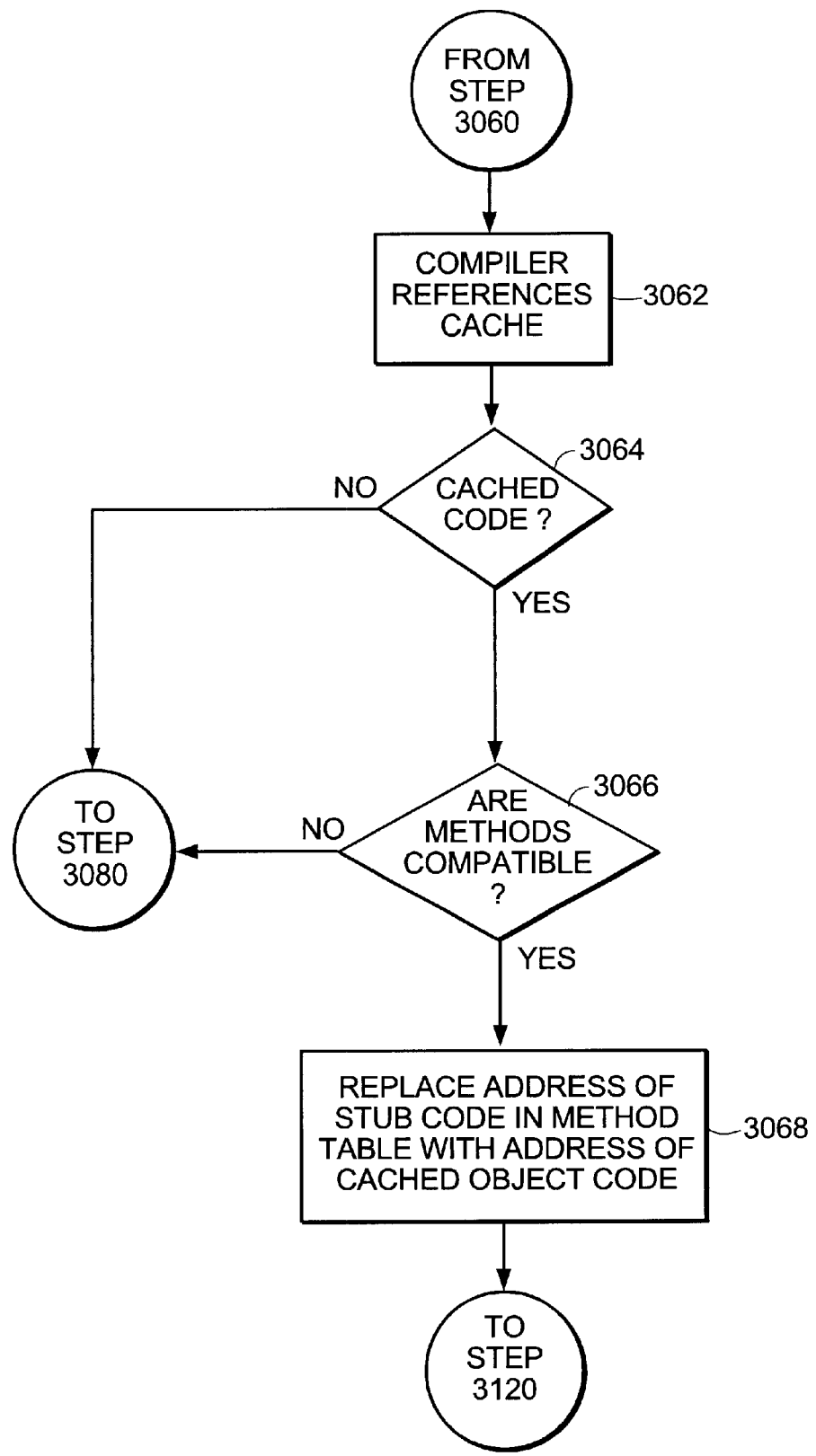
FIG. 11 is a flow diagram illustrating a process for code sharing according to one embodiment of the invention.

Code sharing occurs during the compilation of the body of a method. FIG. 11, with reference to FIG. 7, illustrates the process for code sharing.

After invoking the compiler with the address of the appropriate method descriptor in step 3060 of FIG. 7, the compiler references the cache 115 of the method descriptor 110 for cached object code 116 or, alternatively, the compiler-generated table 117 mapping rules to the cached object code in step 3062.

If, in step 3064, the cache 115 is empty, the compilation process proceeds to step 3080 of FIG. 7, for compiling the source code representation of the method body. Otherwise, if the cache 115 contains cached object code 116 or a rule-based table of cached object code 117, the compiler proceeds to step 3066.

In step 3066, the compiler determines whether the methods are compatible in step 3066. For example, if the method to be compiled matches a rule of the table 117 corresponding to cached object code, then a method is deemed compatible. If the methods are deemed incompatible, the compilation process proceeds back to step 3080. Otherwise, the methods are deemed compatible and the compiler avoids the process of compiling the method body proceeding to step 3068.

In step 3068, the address of the stub code for that method in the method table is replaced with the address of the cached object code.

After updating the method table, the process proceeds to step 3120 of FIG. 7 to begin execution of the invoked method.

FIG. 12A shows an example of a computer system on which embodiments of the present invention may be implemented. As shown, Computer 1 includes a variety of peripherals, among them being: i) a display screen 5 for displaying images/video or other information to a user, ii) a keyboard 6 for inputting text and user commands. Computer 1 may be a personal computer (PC), workstation, embedded system component, handheld computer, telecommunications device or any device containing a memory and processor.

Figure 12B:
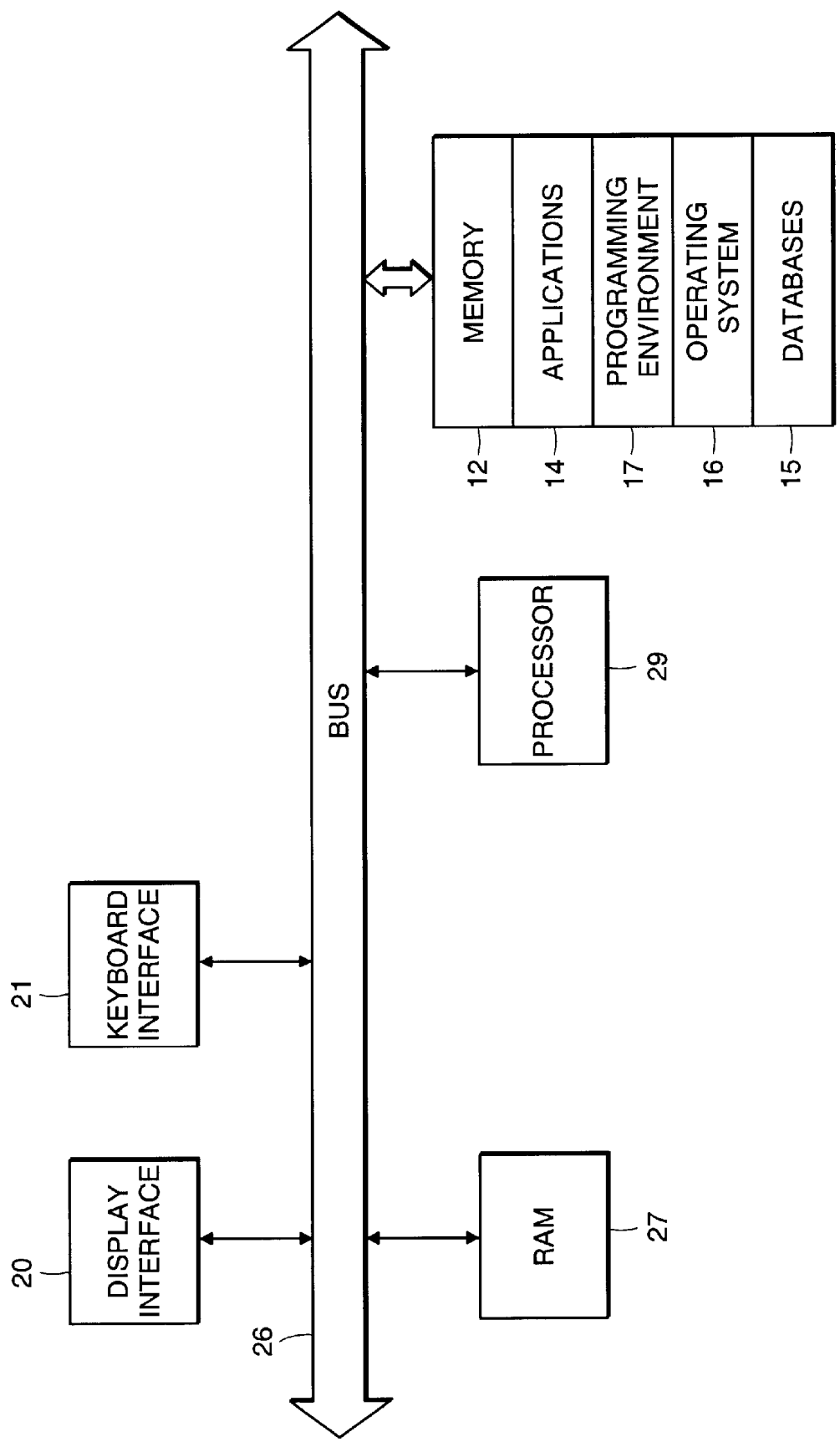
FIG. 12B shows the internal structure of the personal computer of FIG. 12A.

FIG. 12B shows the internal structure of Computer 1. As illustrated, Computer 1 includes mass storage 12, which comprises a computer-readable medium such as a computer hard disk and/or RAID ("redundant array of inexpensive disks"). Mass storage 12 is adapted to store applications 14, databases 15, and operating systems 16. In preferred embodiments of the invention, the operating system 16 is a windowing operating system, such as RedHat® Linux or Microsoft® Windows98, although the invention may be used with other operating systems as well. Among the applications stored in memory 12 is a programming environment 17 and source files.

Programming environment 17 compiles the source files written in a language that creates the output generated by embodiments of the present invention. In the preferred embodiment of the invention, this language is Curl™, developed by Curl Corporation of Cambridge, Mass. The programming language is based upon a language developed at Massachusetts Institute of Technology and presented in "Curl: A Gentle Slope Language for the Web," *WorldWideWeb Journal*, by M. Hostetter et al., Vol II. Issue 2, O'Reilly & Associates, Spring 1997.

Computer 1 also includes display interface 20, keyboard interface 21, computer bus 26, RAM 27, and processor 29. Processor 29 preferably comprises a Pentium II® (Intel Corporation, Santa Clara, Calif.) microprocessor or the like for executing applications. Such applications, including the programming environment and/or embodiments of the present invention 17, may be stored in memory 12 (as above). Processor 29 accesses applications (or other data) stored in memory 12 via bus 26.

Application execution and other tasks of Computer 1 may be initiated using keyboard 6 commands from which are transmitted to processor 29 via keyboard interface 21. Output results from applications running on Computer 1 may be processed by display interface 20 and then displayed to a user on display 5. To this end, display interface 20 preferably comprises a display processor for forming images based on image data provided by processor 29 over computer bus 26, and for outputting those images to display 5.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of compiling program code including a class template and a template-generated class comprising:

creating a representation of the class template from a definition of the class template in the program code, the class template representation including source code representations of methods to serve as a resource for lazy compilation of classes generated from the class template;

creating a partially compiled representation of a class generated from the class template, the class being declared in the program code, the partially compiled class representation including a pointer to the class template representation, the partially compiled class representation including less than all method bindings corresponding to the methods of the class template representation; and for compiling the program code, accessing the class template representation to further compile the partially compiled representation of the class by generating method bindings associated with the class representation for methods referenced in the program code, the method bindings being substantially limited to those methods referenced in the program code, the method bindings being generated from the source code representations of the methods in the class template representation.

2. The method of claim 1 further comprising:

delaying compilation of method bodies of the methods referenced in the program code until the method is invoked, the method bodies being generated from the source code representations of the methods in the class template representation.

3. The method of claim 1 wherein the class template representation includes a source code representation of a type signature and a source code representation of a body, the source code representations of the type signature and the body being associated with a method.

4. The method of claim 3 wherein the source code representation of the type signature and the source code representation of the body are associated with a method descriptor.

5. The method of claim 3 wherein generating method bindings comprises:
creating a method binding;
compiling the source code representation of the type signature for the method resulting in a type signature object; and
associating the type signature object and a method offset with the method binding.

6. The method of claim 5 further comprising:
associating the method binding with the class representation.

7. The method of claim 6 wherein method bindings are associated with the class representation as elements of a linked list.

8. The method of claim 5 further comprising:
compiling a method call instruction using the type signature object and the method offset of the method binding, the method call instruction referencing the method of the class representation.

9. The method of claim 5 further comprising:
scanning the class representation for a previously generated method binding for one of the referenced methods, the scanning occurring prior to creating the method binding.

10. The method of claim 9 further comprising:
scanning the class template representation for a source code represent type signature for the referenced method, the scanning occurring if the method binding is not found in the class representation.

11. The method of claim 3 wherein the class template representation includes a method table, the method table mapping the methods to stub code, the stub code initiating the compilation of the source code representation of the method body when executed.

12. The method of claim 11 wherein the class template representation includes a method table array, the method table array containing a reference to the method table.

13. The method of claim 11 wherein the class representation includes a copy of the method table of class template representation.

14. A method of compiling the body of a method comprising:
providing a class template representation including a source code representation of the body of a method to serve as a resource for lazy compilation of classes generated from a corresponding class template;
providing a partially compiled class representation associated with the class template representation including a method table, the method table storing an address of stub code for the method, the partially compiled class representation including less than all executable code corresponding to methods in the class template representation;
in response to the method being invoked, accessing the class template representation to further compile the partially compiled class representation by executing the stub code, the stub code initiating compilation of the source code representation of the method body from the class template representation;
compiling the method body resulting in executable code; and
replacing the address of the stub code in the method table with an address of the executable code for the method.

15. The method of claim 14 further comprising:
instantiating an instance of the class representation;
invoking the method on the instance; and
referencing the method table of the class representation for the address of the stub code associated with the invoked method, the referencing of the method table occurring prior to executing the stub code.

16. The method of claim 14 wherein compilation of the method body comprises the stub code invoking a compiler with an address of the source code representation of the method body.

17. The method of claim 14 wherein compilation of the method body comprises:
referencing a cache of executable code from the class template representation for cached executable code for, the invoked method, the cache serving as a further resource for lazy compilation of classes generated from the corresponding class template;
determining whether the cached executable code is compatible with the invoked method;
replacing the address of the stub code in the method table with an address of the cached executable code, if compatible.

18. The method of claim 17 wherein the cache is associated with a method descriptor.

19. The method of claim 17 wherein the cache includes the address of the cached executable code.

20. The method of claim 17 wherein the, cache includes the address of a table mapping rules to cached executable code, the rules providing criteria for determining whether the cached executable code is compatible with the invoked method.

21. A system for compiling program code including a class template and a template-generated class comprising:
a representation of the class template, the class template representation being generated from a definition of the class template in the program code, the class template representation including source code representations of methods to serve as a resource for lazy compilation of classes generated from the class template;
a partially compiled representation of a template-generated class, the template-generated class being declared in the program code, the partially compiled class representation including a pointer to the class template representation, the partially compiled class representation including less than all method bindings corresponding to the methods of the class template representation; and
for compiling the program code, the class template representation being accessed to further compile the partially compiled representation of the template-generated class, such that method bindings are generated from the source code representations of the methods of the class template representation, the method bindings being associated with the class representation for methods referenced in the program code, the method bindings being substantially limited to those methods referenced in the program code.

22. The system of claim 21, wherein method bodies of methods referenced in the program code are not compiled until invoked, the method bodies being generated from the source code representations of the methods in the class template representation.

23. The system of claim 21 wherein the class template representation includes a source code representation of a type signature and a source code representation of a body, the source code representations of the type signature and the body being associated with a method.

24. The system of claim 23 wherein the source code representation of the type signature and the source code representation of the body are associated with a method descriptor.

25. The system of claim 23 wherein method bindings associated with a type signature object and a method offset, the type signature object resulting from compiling the source code representation of the type signature.

26. The system of claim 25 wherein method bindings are associated with the class representation.

27. The system of claim 26 wherein method bindings are associated with the class representation as elements of a linked list.

28. The system of claim 25 wherein the type signature object and the method offset are used to compile a method call instruction, the method call instruction referencing the method of the class representation.

29. The system of claim 25 wherein the class representation is scanned for a previously generated method binding representing one of the referenced methods, the class representation being scanned prior to the method binding being created.

30. The system of claim 29 wherein the class template representation is scanned for a source code representation of the type signature for the referenced method, the class template representation being scanned if the method binding is not found within the class representation.

31. The system of claim 23 wherein the class template representation includes a method table, the method table mapping the methods to stub code, the stub code initiating the compilation of the source code representation of the method body when executed.

32. The system of claim 31 wherein the class template representation includes a method table array, the method table array containing a reference to the method table.

33. The system of claim 31 wherein the class representation includes a copy of the method table of the class template representation.

34. A system of compiling the body of a method comprising:
a class template representation, the class template representation including a source code representation of the body of a method to serve as a resource for lazy compilation of classes generated from a corresponding class template;
a partially compiled class representation, the partially compiled class representation associated with the class template representation including a method table, the method table storing an address of stub code for the method, the partially compiled class representation including less than all executable code corresponding to methods in the class template representation; and
in response to the method being invoked, the class template representation being accessed to further compile the partially compiled class representation by executing the stub code that initiates compilation of the source code representation of the method body from the class template representation, the compilation of the method body resulting in executable code, an address of the executable code replacing the address of the stub code in the method table with the address of the executable code for the method.

35. The system of claim 34 further comprising:
an instance of the class representation, a method being invoked on the instance, the method table of the class representation being referenced for the address of the stub code associated with the invoked method, the method table being referenced prior to executing the stub code.

36. The system of claim 34 wherein the stub code invokes compilation of the method body with an address of the source code representation of the method body.

37. The system of claim 34 further comprises:
a cache of executable code, the cache stored within the class template representation to serve as a further resource for lazy compilation of classes generated from the corresponding class template, the cache being referenced during compilation of the method body of the invoked method for cached executable code for the invoked method, an address of the cached executable code replacing the address of the stub code if compatible with the invoked method.

38. The system of claim 37 wherein the cache is associated with a method descriptor.

39. The system of claim 37 wherein the cache includes the address of the cached executable code.

40. The system of claim 37 wherein the cache includes the address of a table mapping rules to cached executable code, the rules providing criteria for determining whether the cached executable code is compatible with the invoked method.

41. A computer program product comprising:
a computer usable medium for compiling program code including a class template and a template-generated class;
a set of computer program instructions embodied on the computer usable medium, including instructions to:
create a representation of the class template from a definition of the class template in the program code, the class template representation including source code representations of methods to serve as a resource for lazy compilation of classes generated from the class template;
create a partially compiled representation of a class generated from the class template, the class being declared in the program code, the partially compiled class representation including a pointer to the class template representation, the partially compiled class representation including less than all method bindings corresponding to the methods of the class template representation; and
for compiling the program code, instructions to access the class template representation to further compile the partially compiled representation of a class by generating method bindings stored in the class representation for methods referenced in the program code, the method bindings being substantially limited to those methods referenced in the program code, the method bindings being generated from the source code representations of the methods in the class template representation.

42. The computer program product of claim 41 further including instructions to:
delay compilation of method bodies of the methods referenced in the program code until the method is invoked, the method bodies being generated from the source code representations of the methods in the class template representation.

43. The computer program product of claim 41 wherein the class template representation includes a source code representation of a type signature and a source code representation for a body, the source code representations of the type signature and the body being associated with a method.

44. The computer program product of claim 43 wherein the source code representation of the type signature and the source code representation of the body are associated with a method descriptor.

45. The computer program product of claim 43 wherein the instruction to generate method bindings includes instructions to:
create a method binding;
compile the source code representation of the type signature for the method resulting in a type signature object; and
associate the type signature object and a method offset with the method binding.

46. The computer program product of claim 45 further including instructions to:
associate the method binding with the class representation.

47. The computer program product of claim 46 wherein method bindings are associated with the class representation as elements of a linked list.

48. The computer program product of claim 45 further including instructions to:
compile a method call instruction using the type signature object and the method offset of the method binding, the method call instruction referencing the method of the class representation.

49. The computer program product of claim 45 further including instructions to:
scan the class representation for a previously generated method binding for one of the referenced methods, the scanning occurring prior to creating the method binding.

50. The computer program product of claim 49 further including instructions to:
scan the class template representation for a source code representation of the type signature for the referenced method, the scanning occurring if the method binding is not found in the class representation.

51. The computer program product of claim 43 wherein the class template representation includes a method table, the method table mapping the methods to stub code, the stub code initiating the compilation of the source code representation of the method body when executed.

52. The computer program product of claim 51 wherein the class template representation includes a method table array, the method table array containing a reference to the method table.

53. The computer program product of claim 51 wherein the class representation includes a copy of the method table of the class template representation.

54. A computer program product comprising:
a computer usable medium for compiling the body of a method;
a set of computer program instructions embodied on the computer usable medium, including instructions to:
provide a class template representation including a source code representation of the body of a method to serve as a resource for lazy compilation of classes generated from a corresponding class template;
provide a partially compiled class representation associated with the class template representation including a method table, the method table storing an address of stub code for the method, the partially compiled class representation including less than all executable code corresponding to methods in the class template representation;
access the class template representation in response to the method being invoked to further compile the partially compiled class representation by executing the stub code, the stub code initiating compilation of the source code representation of the method body from the class template representation;
compile the method body resulting in executable code; and
replace the address of the stub code in the method table with an address of the executable code for the method.

55. The computer program product of claim 54 further including instructions to:
instantiate an instance of the class representation;
invoke the method on the instance; and
reference the method table of the class representation for the address of the stub code associated with the invoked method, the referencing of the method table occurring prior to executing the stub code.

56. The computer program product of claim 54 wherein the instructions to compile the method body includes the instructions to execute stub code that invokes a compiler with an address of the source code representation of the method body.

57. The computer program product of claim 54 wherein the instructions to compile the-method body includes instructions to:
reference a cache of executable code from the class template representation for cached executable code for the invoked method, the cache serving as a further resource for lazy compilation of classes generated from the corresponding class template;
determine whether the cached executable code is compatible with the invoked method; and
replace the address of the stub code in the method table with an address of the cached executable code if compatible.

58. The computer program product of claim 57 wherein the cache is associated with a method descriptor.

59. The computer program product of claim 57 wherein the cache includes the address of the cached executable code.

60. The computer program product of claim 57 wherein the cache includes the address of a table mapping rules to cached executable code, the rules providing criteria for determining whether the cached executable code is compatible with the invoked method.

61. A computer data signal embodied in a carrier wave comprising a code segment for compiling program code that includes a class template and a template-generated class, the code segment comprising instructions for:
creating a representation of the class template from a definition of the class template in the program code, the class template representation including source code representations of methods to serve as a resource for lazy compilation of partially compiled classes generated from the class template;
creating a partially compiled representation of a class generated from the class template, the class being declared in the program code, the partially compiled class representation including a pointer to the class template representation, the partially compiled class representation including less than all method bindings corresponding to the methods in the class template representation; and for compiling the program code, accessing the class template to further compile the partially compiled representation of the class by generating method bindings stored in the class representation for methods referenced in the program code, the method bindings being substantially limited to those methods referenced in the program code, the method bindings being generated from the source code representations of the methods in the class template representation.

62. The code segment of the computer data signal of claim 61 further comprising instructions for:

delaying compilation of method bodies of the methods referenced in the program code until the method is invoked, the method bodies being generated from the source code representations of the methods in the class template representation.

63. The code segment of the computer data signal of claim 61 wherein the class template representation includes a source code representation of a type signature and a source code representation of a body, the source code representations of the type signature and the body being associated with a method.

64. The code segment of the computer data signal of claim 63 wherein the source code representations the source code representation of the type signature and the source code representation of the body are associated with a method descriptor.

65. The code segment of the computer data signal of claim 63 wherein the instruction for generating method bindings comprises:

creating a method binding;

compiling the source code representation of the type signature for the method resulting in a type signature object; and associating the type signature object and a method offset with the method binding.

66. The code segment of the computer data signal of claim 65 further comprising instructions for:

associating the method binding with the class representation.

67. The code segment of the computer data signal of claim 66 wherein method bindings are associated with the class representation as elements of a linked list.

68. The code segment of the computer data signal of claim 65 further comprising instructions for:

compiling a method call instruction using the type signature object and the method offset of the method binding, the method call instruction referencing the method of the class representation.

69. The code segment of the computer data signal of claim 65 further comprising instructions for:

scanning the class representation for a previously generated method binding for one of the referenced methods, the scanning occurring prior to creating the method binding.

70. The code segment of the computer data signal of claim 69 further comprising instructions for:

scanning the class template representation for a source code representation of the type signature for the referenced method, the scanning occurring if the method binding is not found in the class representation.

71. The code segment of the computer data signal of claim 63 wherein the class template representation includes a method table, the method table mapping the methods to stub code, the stub code initiating the compilation of the source code representation of the method body when executed.

72. The code segment of the computer data signal of claim 71 wherein the class template representation includes a method table array, the method table array containing a reference to the method table.

73. The code segment of the computer data signal of claim 71 wherein the class representation includes a copy of the method table of the class template representation.

74. A computer data signal embodied in a carrier wave comprising a code segment for compiling the body of a method, the code segment comprising instructions for:

providing a class template representation including a source code representation of the body of a method to serve as a resource for lazy compilation of classes generated from a corresponding class template;

providing a partially compiled class representation associated with the class template representation including a method table, the method table storing an address of stub code for the method, the partially compiled class representation including less than all executable code corresponding to methods in the class template representation;

in response to the method being invoked, accessing the class template representation to further compile the partially compiled class representation by executing the stub code, the stub code initiating compilation of the source code representation of the method body from the class template representation;

compiling the method body resulting in executable code; and replacing the address of the stub code in the method table with an address of the executable code for the method.

75. The code segment of the computer data signal of claim 74 further comprising instructions for:

instantiating an instance of the class representation;

invoking the method on the instance; and referencing the method table of the class representation for the address of the stub code associated with the invoked method, the referencing of the method table occurring prior to executing the stub code.

76. The code segment of the computer data signal of claim 74 wherein compilation of the method body comprises the stub code invoking a compiler with an address of the source code representation of the method body.

77. The code segment of the computer data signal of claim 74 wherein compilation of the method body comprises:

referencing a cache of executable code from the class template representation for cached executable code for the invoked method, the cache serving as a further resource for lazy compilation of classes generated from the corresponding class template;

determining whether the cached executable code is compatible with the invoked method;

replacing the address of the stub code in the method table with an address of the cached executable code if compatible.

78. The code segment of the computer data signal of claim 77 wherein the cache is associated with a method descriptor.

79. The code segment of the computer data signal of claim 77 wherein the cache includes the address of the cached executable code.

80. The code segment of the computer data signal of claim 77 wherein the cache includes the address of a table mapping rules to cached executable code, the rules providing criteria for determining whether the cached executable code is compatible with the invoked method.

81. A method of compiling the body of a method comprising:

provided a class template representation including a cache of executable code to serve as a resource for lazy compilation of classes generated from a corresponding class template;

providing a partially compiled class representation associated with the class template representation including a method table, the partially compiled class representation including less than all executable code corresponding to methods in the class template representation;

invoking a method that is identified in the method table of the class representation;

accessing the class template representation to further compile the partially compiled class representation by referencing the cache from the class template representation for executable code in response to the method being invoked; and mapping an address of the executable code to the method in the method table.

82. A system of compiling the body of a method comprising:

a class template representation including a cache of executable code to serve as a resource for lazy compilation of classes generated from a corresponding class template;

a partially compiled class representation associated with the class template representation including a method table, the partially compiled class representation including less than all executable code corresponding to methods in the class template representation;

the cache from the class template representation being referenced for executable code in response to a method being invoked, the method being identified in the method table; and the method table mapping an address of the executable code to the method.

83. A computer program product comprising:

a computer usable medium for compiling the body of a method;

a set of computer program instructions embodied on the computer usable medium including instructions to:

provide a class template representation including a cache of executable code to serve as a resource for lazy compilation of classes generated from a corresponding class template;

provide a partially compiled class representation associated with the class template representation including a method table, the partially compiled class representation including less than all executable code corresponding to methods in the class template representation;

invoke a method that is identified in the method table of the class representation;

access the class template representation to further compile the partially compiled class representation by referencing the cache from the class template representation for compatible executable code in response to the method being invoked; and map an address of the compatible executable code to the method in the method table.

84. A computer data signal embodied in a carrier wave comprising a code segment for compiling the body of a method, the code segment comprising instructions for:

providing a class template representation including a cache of executable code to serve as a resource for lazy compilation of classes generated from a corresponding class template;

providing a partially compiled class representation associated with the class template representation including a method table, the partially compiled class representation including less than all executable code corresponding to methods in the class template representation;

invoking a method that is identified in the method table of the class representation;

accessing the class template representation to further compile the partially compiled class representation by referencing the cache from the class template representation for compatible executable code in response to the method being invoked; and mapping an address of the compatible executable code to the method in the method table.

* * * * *

UNITED STATES PATENT AND TRADEMARK OFFICE
CERTIFICATE OF CORRECTION

PATENT NO. : 6,760,905 B1
DATED : July 6, 2004
INVENTOR(S) : Mathew J. Hostetter and David Kranz It is certified that error appears in the above-identified patent and that said Letters Patent is hereby corrected as shown below:

Column 15,
Line 34, delete "represent" and insert -- representation of the --.

Signed and Sealed this

Seventh Day of September, 2004

JON W. DUDAS
*Director of the United States Patent and Trademark Office*